US012284183B2

(12) United States Patent
Moreton et al.

(10) Patent No.: US 12,284,183 B2
(45) Date of Patent: Apr. 22, 2025

(54) URL-BASED AUTHENTICATION FOR PAYMENT CARDS

(71) Applicant: Capital One Services, LLC, McLean, VA (US)

(72) Inventors: Paul Moreton, Glen Allen, VA (US); Jeffrey Rule, Chevy Chase, MD (US)

(73) Assignee: Capital One Services, LLC, McLean, VA (US)

( * ) Notice: Subject to any disclaimer, the term of this patent is extended or adjusted under 35 U.S.C. 154(b) by 38 days.

(21) Appl. No.: 18/236,533

(22) Filed: Aug. 22, 2023

(65) Prior Publication Data

US 2023/0396617 A1 Dec. 7, 2023

Related U.S. Application Data

(63) Continuation of application No. 17/166,622, filed on Feb. 3, 2021, now Pat. No. 11,777,933.

(51) Int. Cl.
| | |
|---|---|
| *H04L 9/40* | (2022.01) |
| *G06Q 20/34* | (2012.01) |
| *G06Q 20/40* | (2012.01) |
| *H04L 9/32* | (2006.01) |

(52) U.S. Cl.
CPC ....... *H04L 63/0876* (2013.01); *G06Q 20/352* (2013.01); *G06Q 20/40145* (2013.01); *H04L 9/3226* (2013.01); *H04L 63/083* (2013.01); *H04L 63/0861* (2013.01)

(58) Field of Classification Search
None
See application file for complete search history.

(56) References Cited

U.S. PATENT DOCUMENTS

| | | | |
|---|---|---|---|
| 6,275,934 B1 * | 8/2001 | Novicov | H04L 9/40 713/168 |
| 10,467,622 B1 * | 11/2019 | Rule | G06Q 20/352 |
| 11,210,676 B2 * | 12/2021 | Rule | G06T 7/70 |

(Continued)

FOREIGN PATENT DOCUMENTS

| | | | | |
|---|---|---|---|---|
| CN | 105409264 A | * | 3/2016 | G06F 21/35 |
| CN | 111143802 A | * | 5/2020 | G06F 21/32 |
| JP | 2005025638 A | * | 1/2005 | |

(Continued)

*Primary Examiner* — Richard A McCoy
(74) *Attorney, Agent, or Firm* — KDW Firm PLLC

(57) ABSTRACT

Systems, methods, articles of manufacture for authentication of payment cards. A server may assign, in a database, an expected card identifier to a contactless card, the contactless card associated with an account. The server may receive, from a client device, a request comprising a uniform resource locator (URL), a parameter of the URL comprising a card identifier, wherein the URL is transmitted by the contactless card to the client device. The server may extract the card identifier from the URL and compare the extracted card identifier to the expected card identifier in the database. The server may determine, based on the comparison, that the extracted card identifier matches the expected card identifier. The server may authenticate the request based on the extracted card identifier matching the expected card identifier, and transmit, to the client device, an indication specifying that the request was authenticated.

20 Claims, 13 Drawing Sheets

(56) References Cited

U.S. PATENT DOCUMENTS

2006/0224512 A1\* 10/2006 Kurakata ........... G07C 9/00912
　　　　　　　　　　　　　　　　　　　　　705/50
2020/0019725 A1\* 1/2020 Rule .................... G06Q 20/326

FOREIGN PATENT DOCUMENTS

JP　　　　2009043271 A　\*　2/2009　........... H04L 63/083
WO　　WO-2010050192 A1　\*　5/2010　............. G06F 21/31

\* cited by examiner

URL-BASED AUTHENTICATION FOR PAYMENT CARDS

CROSS-REFERENCE TO RELATED APPLICATIONS

This application is a continuation of U.S. patent application Ser. No. 17/166,622, filed on Feb. 3, 2021, the disclosure of which is incorporated herein by reference in its entirety.

TECHNICAL FIELD

Embodiments herein generally relate to computing platforms, and more specifically, to tapping a payment card to a computing device for uniform resource locator (URL)-based authentication.

BACKGROUND

Detecting fraud and other malicious activity are common security problems related to payment cards. These problems are exacerbated as the number of cards increases, with some financial institutions issuing millions of payment cards, or more. Prior authentication solutions lack the flexibility and scalability required to fully address fraud and security issues.

SUMMARY

Embodiments disclosed herein provide systems, methods, articles of manufacture, and computer-readable media for URL-based authentication of payment cards. According to one example, a method comprises assigning, by a server in a database, an expected card identifier to a contactless card, the contactless card associated with an account, the server comprising a memory and a processor circuit. The method may further comprise receiving, by the server from a client device, a request comprising a uniform resource locator (URL), a parameter of the URL comprising a card identifier, wherein the URL is transmitted by the contactless card to the client device, and extracting, by the server, the card identifier from the URL. The method may further comprise comparing, by the server, the extracted card identifier to the expected card identifier in the database, and determining, by the server based on the comparison, that the extracted card identifier matches the expected card identifier. The method may further comprise authenticating the request by the server based on the extracted card identifier matching the expected card identifier, and transmitting, by the server to the client device, an indication specifying that the request was authenticated. Other embodiments are described and claimed.

DETAILED DESCRIPTION

Figure 1A:
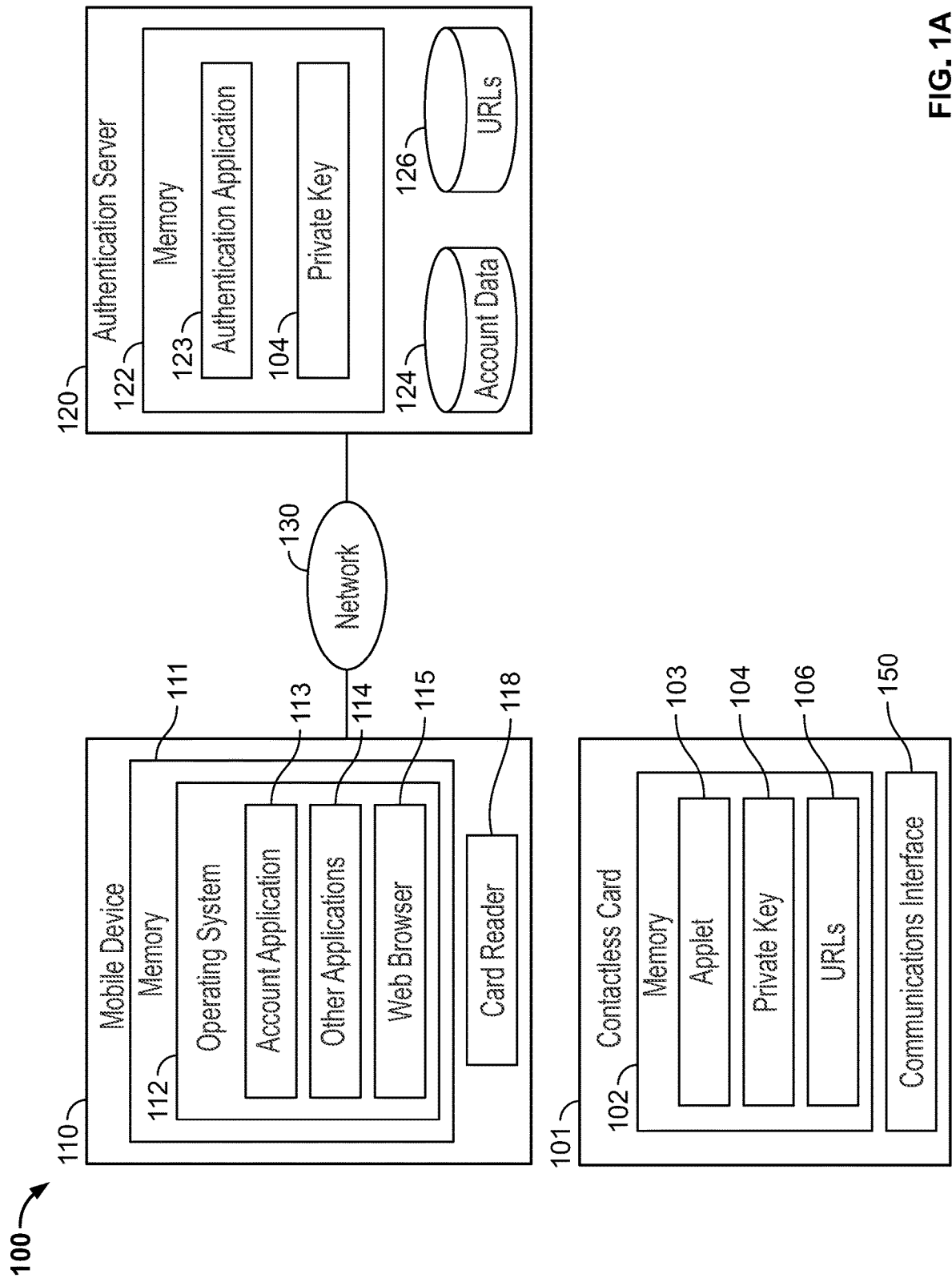
FIGS. 1A-1C illustrate embodiments of a system for URL-based authentication of payment cards.

Embodiments disclosed herein provide secure techniques to authenticate payment cards based at least in part on one or more uniform resource locators (URLs). The URLs may include static URLs assigned to (and stored by) the payment card and/or dynamic URLs generated by the payment card. Generally, the URLs may include data used by an authentication server as part of an authentication process. For example, in the static URL context, a URL (and/or a portion of the URL) may be assigned as a card identifier of a payment card when the card is manufactured. The URL (and/or the portion of the URL) may be assigned to the payment card in a database record and stored in a memory of the payment card for later use. For example, the URL may be "http://www.example.com/auth?p=cardidentifier". In such an example, the entire URL may be the card identifier assigned to the card. In addition and/or alternatively, the "cardidentifier" parameter of the URL may be the card identifier assigned to the card, where "cardidentifier" corresponds to a string, such as string of 64 or 128 alphanumeric characters. Furthermore, at least a portion of the URL, such as the "http://www.example.com" portion, may be directed to an authentication server and/or an application.

In the static URL example, the payment card may be tapped to a computing device, such as a mobile phone. Doing so may cause the payment card to generate a data payload comprising the URL, and transmit the payload comprising the URL to the computing device using wireless communications (e.g., near-field communications (NFC), Bluetooth®, and the like). Once received, the URL may cause an operating system (OS) of the device to open an application that accesses the URL. The application may be a web browser or other application, such as an account application provided by the issuer of the card that allows users to perform account-related activities. Once opened, the application may access the URL using a request, e.g., a hypertext transfer protocol (HTTP) request that comprises the URL. The authentication server may then attempt to authenticate the URL (and/or the portion of the URL corresponding to the card). For example, the authentication server may determine whether the URL matches a URL stored in the database. If a match exists, the authentication server may authenticate the request, and transmit an indication of the successful authentication to the device. In some embodiments, the request is associated with an operation, such as viewing an account balance. In such embodiments, an indication of the requested operation may be specified as an additional parameter of the URL by the card and/or the account application. In such embodiments, the authentication server may identify the requested operation parameter and provide account-related data, such as the requested account balance, to the device. The device may then output the indication and/or the received data. The device may further permit performance of one or more requested operations based on the successful authentication. If, however, a match for the URL does not exist in the database, the authentication server may determine the authentication attempt has failed. The authentication server may then transmit an indication of the failed authentication to the device, which may restrict any requested operations.

In a dynamic URL example, the card may dynamically generate a URL that includes a dynamic card identifier. For example, an applet of the card may use a function and/or algorithm (e.g., a hash function, cryptographic function, random number generator, etc.) to generate an alphanumeric dynamic card identifier as a parameter of the URL. The card may transmit the dynamically generated URL to the computing device, which in turn launches an application (e.g., web browser, account application, etc.) that accesses the URL using a request. In some embodiments, an additional parameter corresponding to a requested account operation may be added to the URL by the card and/or the account application. The server may receive the request and extract the dynamic card identifier. The server may also compute an expected dynamic card identifier using the same function and/or algorithm used by the contactless card. If the expected dynamic card identifier generated by the server matches the dynamic card identifier extracted from the URL, the server may authenticate the request. Otherwise, the server may determine that authentication has failed. The server may again transmit an indication of the authentication result to the device. If the authentication is successful, the server may further transmit requested data to the device, such as account information, balances, etc. In such examples, the requested data may be transmitted based on the additional parameter of the URL that specifies the requested account operation.

Advantageously, embodiments disclosed herein improve security of all devices and associated data. For example, some operating systems may restrict access to data stored in payment cards, and/or specific types of data stored in payment cards. Therefore, conventional authentication techniques cannot function properly. Advantageously, however, embodiments disclosed herein allow payment cards to generate URLs that are used for authentication. Because the URLs are too complex to be replicated by malicious entities, embodiments disclosed herein improve the security of payment cards and computing services associated with the payment cards.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1A depicts a schematic of an exemplary system 100, consistent with disclosed embodiments. As shown, the system 100 includes one or more contactless cards 101, one or more mobile devices 110, and an authentication server 120. The contactless cards 101 are representative of any type of payment card, such as a credit card, debit card, ATM card, gift card, and the like. The contactless cards 101 may comprise one or more communications interfaces 150, such as a radio frequency identification (RFID) chip, configured to communicate with the mobile devices 110 via NFC, the Europay, MasterCard, and Visa (EMV®) standard, or other short-range protocols in wireless communication. Although NFC is used as an example communications protocol, the disclosure is equally applicable to other types of wireless communications, such as the EMV standard, Bluetooth, and/or Wi-Fi. The mobile devices 110 are representative of any type of network-enabled computing devices, such as smartphones, tablet computers, wearable devices, laptops, portable gaming devices, and the like. The server 120 is representative of any type of computing device, such as a server, workstation, compute cluster, cloud computing platform, virtualized computing system, and the like.

As shown, a memory 111 of the mobile device 110 includes an instance of an operating system (OS) 112. Example operating systems 112 include the Android® OS, iOS®, macOS®, Linux®, and Windows® operating systems. As shown, the OS 112 includes an account application 113, one or more other applications 114, and a web browser 115. The account application 113 allows users to perform various account-related operations, such as viewing account balances, purchasing items, and/or processing payments. In some embodiments, a user must authenticate using authentication credentials to access the account application 113. For example, the authentication credentials may include a username and password, biometric credentials, and the like. In some embodiments, the authentication server 120 may provide the required authentication as described in greater detail below. The web browser 115 is an application that allows the mobile device 110 to access information via the network 130 (e.g., via the Internet). For example, a user may make purchases from a merchant's website using the web browser 115. The web browser 115 is one example of an application used to access information via the network 130 (e.g., to make purchases, access account information, etc.). The other applications 114 are representative of any other types of applications used to access information via the network 130, such as applications provided by merchants that allow users to make purchases, or other application-store applications.

As shown, the server 120 includes an authentication application 123, instances of a private key 104 assigned to each contactless card 101, account data 124, URLs 126. The account data 124 may include at least a private key 104, a customer ID 107, an associated contactless card 101, card identifiers, account holder name, account billing address, one or more shipping addresses, one or more virtual card numbers, and biographical information for each account. The URLs 126 may include one or more URLs and/or card IDs assigned to a contactless card and an indication of the associated customer account (e.g., the associated customer ID).

Advantageously, the system 100 is configured to provide URL-based authentication using one or more URLs stored and/or generated by the contactless card 101. As shown, the contactless card 101 includes a memory 102 storing an applet 103 for execution by a processor (not pictured in FIG. 1). The memory 102 further stores an instance of a private key 104 and a data store of one or more URLs 106. The URLs 106 may reflect one or more static URLs that may be assigned to the contactless card 101 when the contactless card 101 is manufactured. Furthermore, as discussed in reference to FIGS. 2A-2B, the applet 103 of the contactless card 101 may generate one or more dynamic URLs.

In the static URL context, one or more static URLs assigned to the contactless card 101 may be stored by the server 120, such as in the URLs 126 and/or the account data 124 when the card is manufactured. Doing so reflects that the URLs are associated with the contactless card 101. The URLs 126 may store a plurality of URLs and an indication of an account and/or contactless card 101 associated with each URL. Generally, the static URLs 106 may include a resource locator portion, such as "http://www.example.com", which may identify a location of a resource, such as the server 120, the authentication application 123, and/or the account application 113. Furthermore, the static URLs 106 may include a card identifier (ID) portion. For example, a first URL 106-1 may be "http://www.example.com/?cardid=123ABC456". In such an example, the "cardid" portion identifies the card ID parameter of the URL, and "123ABC456" is a simplified example of a card ID. In other examples, the card ID may be a much longer (e.g., 64-bit, 128-bit, 256-bit, etc.) string of alphanumeric characters. In one example, the card ID is a Payment Account Reference (PAR) value defined in the EMV standard. A PAR value may be uniquely associated with a given contactless card 101 (and/or the primary account number (PAN) of the contactless card) and any payment tokens associated with the contactless card 101. Therefore, in such examples, each contactless card 101 may store a unique PAR value. More generally, the card ID may take any suitable format and/or length. In some examples, the entire URL 106-1 comprises the card ID. In some examples, the URL may be a universal link URL that opens a local resource (e.g., a page of the account application 113, one of the other applications 114, etc.).

Therefore, the contactless card 101 may be associated with one or more card identifiers during the manufacture of the contactless card 101. For example, a second URL 106-2 stored in the memory may be "http://www.example.com/?cardid=789XYZ012", where "789XYZ012" is the example card ID parameter. Generally, any suitable algorithm may be used to generate the static URLs 106 and/or the card IDs assigned to a contactless card 101 that are included as parameters of the URLs 106. For example, one or more of a hash function, encryption algorithm, random number generator, or any other type of algorithm may be used to generate one or more card IDs and/or static URLs 106 for the contactless card 101. In some embodiments, the card ID may be encrypted using the private key 104 of the contactless card 101. For example, the PAR value may be encrypted using the private key 104 of the contactless card 101, thereby generating an encrypted PAR value to be used as the card ID parameter of the URL 106. As another example, a hash function may be used to compute a hash value, and an encryption function may encrypt the hash value, thereby generating an encrypted hash value to be used as the card ID parameter of the URL 106. Generally, the authentication application 123 may generate static card IDs and/or URLs 106 for a plurality of contactless cards 101 and store the card IDs and/or URLs 106 in one or more records associated with the corresponding account (e.g., in the account data 124 and/or URLs 126).

In the static URL example, the contactless card 101 may use an offset value, or some other selection pattern, used to select one static URL 106 from a list of a plurality of static URLs 106. For example, if the contactless card 101 includes 100 distinct static URLs 106, the applet 103 may apply an offset to the most recently used URL 106 (or the initial URL 106 in the first instance of selection), e.g., to select every $2^{nd}$, $3^{rd}$, $4^{th}$, $5^{th}$ etc., URL 106, to provide an additional measure of security. Doing so allows the authentication application 123 to determine the corresponding offset and select one of the 100 static URLs as the expected URL for comparison.

The static URLs 106 (and/or any URLs dynamically generated by the applet 103) may be used in various contexts to provide URL-based authentication that is initiated with a tap (or other similar gesture) of the contactless card 101 to the device 110. For example, the device 110 may display a home screen of the OS 112 when the card 101 is tapped to the device 110. In some such embodiments, the device 110 may not include an instance of the account application 113, and a URL received from the card 101 may cause the OS 112 to launch the web browser 115 to the received URL. As another example, the web browser 115 may be running in the foreground of the OS. As yet another example, the account application 113 may be running in the foreground of the OS. Furthermore, each application 113, 114, 115 may be at any state to provide URL-based authentication. For example, the account application 113 may be at a login page, account detail page after authentication credentials are received, a transfer balance page, etc. Similarly, a merchant application 114 may be at a checkout page used to process an order. Embodiments are not limited in these contexts.

More generally, to leverage URL-based authentication, a user may tap the contactless card 101 to the mobile device 110, thereby bringing the contactless card 101 sufficiently close to the card reader 118 (e.g., a communications interface) of the mobile device 110 to enable NFC data transfer between the communications interface 150 of the contactless card 101 and the card reader 118 of the mobile device 110. In some embodiments, the mobile device 110 may trigger the card reader 118 via an application program interface (API) call. In one example, the mobile device 110 triggers the card reader via an API call responsive to the user tapping or otherwise selecting an element of the user interface, such as a form field. In addition and/or alternatively, the mobile device 110 may trigger the card reader 118 based on periodically polling the card reader 118. More generally, the mobile device 110 may trigger the card reader 118 to engage in communications using any feasible method. After communication has been established between mobile device 110 and contactless card 101, the contactless card 101 generates a message authentication code (MAC) cryptogram. In some examples, this may occur when the contactless card 101 is read by the account application 113 and/or the OS 112. In particular, this may occur upon a read, such as an NFC read, of a near field data exchange (NDEF) tag, which may be created in accordance with the NFC Data Exchange Format. The cryptogram may include a static URL 106 and/or a dynamic URL for URL-based authentication.

In one such example, the applet 103 of the contactless card 101 generates and transmits a data package (e.g., an NDEF file) to the mobile device 110 via the communications interface 150. In some embodiments, the data package generated by the contactless card 101 may include a static URL 106-1 selected from the static URLs 106. As discussed in greater detail with reference to FIGS. 2A-2B, the applet may additionally and/or alternatively generate a dynamic URL. As stated, the URL 106 may further include parameters (e.g., a card ID) used by the authentication server 120 to validate the data generated by the contactless card 101. Furthermore, in some embodiments, the URL 106 may include an additional parameter used to specify a requested operation. For example, a user of the account application 113 may wish to view an account balance. In such an example, the account application 113 may instruct the applet 103 to append an additional parameter to the URL 106 that indicates the URL 106 is associated with a requested account balance operation.

Figure 1B:
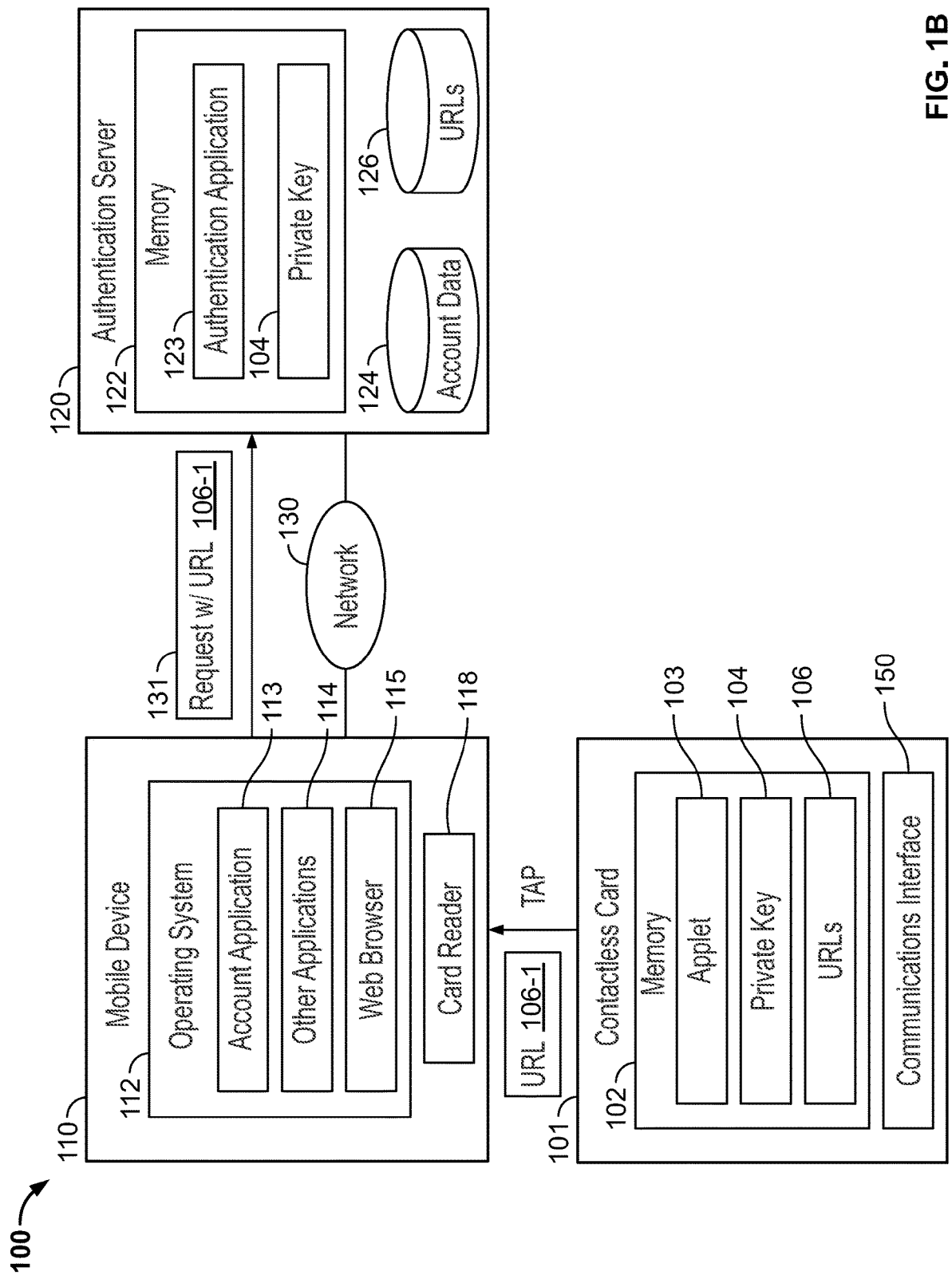

FIG. 1B depicts an embodiment where the applet 103 of the contactless card 101 has selected an example URL 106-1. As shown, the applet 103 may transmit the selected static URL 106-1 to the mobile device 110. As stated, the device 110 may be in any active state to leverage URL-based authentication. Therefore, for example, the OS 112 may launch an application based on the received URL 106-1. For example, the OS 112 may launch the web browser 115, which may follow or otherwise access or load the URL 106-1. In another embodiment, the OS 112 may open the account application 113, which may access the URL 106-1. In yet another embodiment, the OS 112 may open one of the other applications 114 that is associated with the URL 106-1. In some embodiments, the account application 113 may append additional data to the URL, such as the additional parameter corresponding to a requested operation (e.g., viewing account balances, generating a virtual account number, etc.). Furthermore, the account application 113 and/or other applications 114 may transmit the URL 106-1 to an appropriate server and/or instance of the authentication application 123 (e.g., an application 114 provided by merchant A may send the URL 106-1 to a server associated with merchant A).

In the example depicted in FIG. 1B, at least a portion of the URL 106-1 may be directed to the authentication application 123 and/or the authentication server 120. In some examples, the web browser 115 and/or account application 113 may generate a request, such as a hypertext transfer protocol (HTTP) request 131 comprising the URL 106-1. In some embodiments, the URL 106-1 causes the account application 113 to be opened by the OS 112, and the account application 113, in turn, generates a request 131 comprising at least the card ID parameter and/or the URL 106-1 to the authentication application 123. As stated, however, in some embodiments, an instance of the account application 113 is not installed on the device 110. Therefore, in such embodiments, the URL 106-1 may be received by the OS 112. In response to receiving the URL 106-1, the OS 112 may then open the web browser 115, and cause the web browser 115 to generate an HTTP request 131 directed to the URL 106-1.

The authentication application 123 may generally receive the request 131 and attempt to authenticate the card ID. For example, if the URL includes an encrypted card ID (e.g., an encrypted PAR value, an encrypted customer ID, etc.), the authentication application 123 may decrypt the cryptographic payload using a copy of the private key 104 stored in the memory 122 of the server 120. The private key 104 may be identical to the private key 104 stored in the memory 102 of the contactless card 101, where each contactless card 101 is manufactured to include a unique private key 104 (and the server 120 stores a corresponding copy of each unique private key 104). Therefore, the authentication application 123 may successfully decrypt the encrypted card ID. In embodiments where the card ID is not encrypted, the authentication application 123 may generally extract the card ID parameter from the URL 106-1. As stated, however, in some embodiments, the URL 106-1 in its entirety comprises the card ID. However, for the sake of clarity, the discussion will continue using the card ID parameter, and not the URL 106-1 in its entirety, as the card ID.

Once decrypted and/or extracted, the authentication application 123 may then compare the card ID to one or more known, or expected, card IDs to attempt to find a match. In some embodiments, since each card ID and/or URL is unique and too complex to be successfully duplicated by a malicious actor, the authentication application 123 may compare the card ID to the URLs 126 and/or account data 124 to find any matching card ID. If a match exists (e.g., the card ID matches a parameter of one or more URLs 126 and/or a card ID specified in the account data 124), the authentication application 123 may authenticate the request (and/or card ID and/or URL 106-1). For example, if the card ID is the PAR value, the authentication application 123 may determine whether the decrypted PAR value matches a parameter of one or more URLs 126 and/or a PAR value assigned to a card 101 in the account data 124. In other embodiments, the authentication application 123 may receive information allowing the authentication application 123 to conduct a more focused search for an expected card ID. For example, if the request 131 is generated by the account application 113, a user may have logged in to their account using authentication credentials (e.g., biometric credentials, login/password, etc.). In such an example, the account application 113 may include an account ID parameter in the URL 106-1. Doing so allows the authentication application 123 to identify one or more card IDs associated with the contactless card 101 in one or more records of account data 124 and/or the URLs 126 associated with the account ID parameter. Furthermore, as stated, the applet 103 may use an offset or other selection pattern to select one of a plurality of URLs 106 as the URL 106-1. In such examples, the authentication application 123 may apply the same offset to select a URL 106 for comparison (e.g., the $4^{th}$ URL in a list of URLs assigned to the contactless card 101). Doing so allows the authentication application 123 to cause the authentication to fail if a valid URL is received but is not correctly selected based on the offset (e.g., where the $2^{nd}$ URL 106 stored in the contactless card 101 is received, but the $4^{th}$ URL is expected based on the offset or other selection logic).

If a match exists, the authentication application 123 may authenticate the request (and/or card ID and/or URL 106-1). In some embodiments, the authentication application 123 may receive location data from the device 110 (e.g., global positioning system (GPS) coordinates, IP addresses used to determine location, etc.). In such embodiments, the authentication application 123 may determine whether the location data indicates the device 110 is within a threshold distance of one or more known locations associated with the account (e.g., a home address, work address, etc.). If the device is not within the threshold distance of a known location, the authentication application 123 may determine that the authentication fails.

In some embodiments, based on successful authentication, the authentication application 123 may provide data to the device 110, such as account balances, virtual card numbers, statement data, etc. In some such embodiments, the authentication application 123 selects the data based on the additional parameter of the URL 106-1 that specifies a requested operation (e.g., a parameter specifying to view account balance, return a virtual account number, etc.). For example, in embodiments where the request 131 is generated by the web browser 115 because the device 110 does not include an instance of the account application 113, the authentication application 123 may transmit instructions to the web browser 115 that cause the web browser 115 and/or the OS 112 to download and install an instance of the account application 113 on the device 110.

More generally, if a match of the card ID and/or URL 106-1 is not found, the authentication application 123 may determine that the authentication has failed. In such an example, the authentication application 123 may transmit a response to the device 110. In response, the requesting application (e.g., the web browser 115 and/or account application 113) may output an indication to the user specifying that the authentication failed. Doing so enhances the security of the contactless card 101 and/or the underlying account, as the contactless card 101 cannot be used to perform operations without approval from the authentication application 123.

Figure 1C:
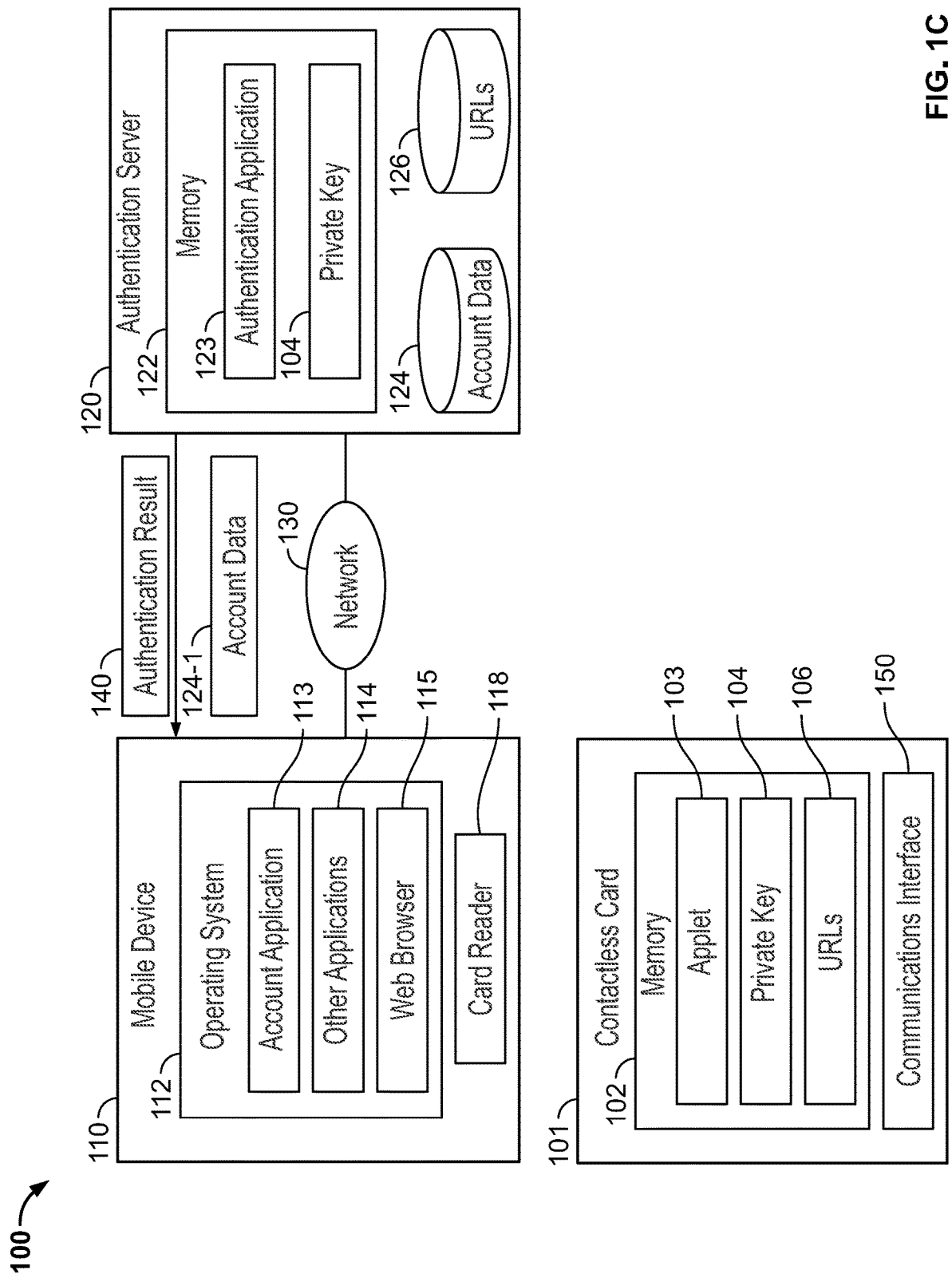

FIG. 1C depicts an embodiment where the authentication application 123 successfully authenticates the card ID and/or URL 106-1 specified in the request 131, e.g., by determining a match of the card ID and/or URL 106-1 exists in the URLs 126 and/or account data 124. As shown, the authentication application 123 transmits an authentication result 140 which indicates that the authentication was successful. The authentication result 140 indicates, to the mobile device 110, whether the authentication was successful or unsuccessful. In the depicted embodiment, because the authentication was successful, the authentication application 123 further transmits account data 124-1 to the device 110. The account data 124-1 may be for the account associated with the contactless card 101. In some embodiments, the authentication application 123 selects the account data 124-1 based on default data associated with URL-based authentication (e.g., account holder name, account balance, etc.). In other embodiments, the authentication application 123 selects the account data 124-1 based on a parameter in the request 131. For example, the parameter of the URL 106-1 may specify to return an account billing address. In such an example, the authentication application 123 may select the account billing address from the account data 124 as the account data 124-1.

More generally, any number and types of operations may be performed based on successful authentication of the URL 106-1 and/or the card ID. For example, the authentication application 123 may instruct the account application 113, other application 114, and/or web browser 115 to capture authentication credentials (e.g., biometric data, username/password, etc.) for the account. The captured credentials may then be transmitted to the authentication application 123 for verification and/or verified locally by the account application 113. As another example, the authentication application 123 may cause a one-time use virtual account number (VAN) to be generated for the account. The VAN and associated expiration date and card verification value (CVV) may then be transmitted to the device 110. In some embodiments, the received VAN, expiration date, and/or CVV may be autofilled to one or more forms. In some embodiments, the VAN, expiration date, and/or CVV may be copied to a clipboard of the OS 112 by the account application 113, other application 114, and/or web browser 115. Embodiments are not limited in these contexts. As another example, one or more operations may be performed based on the received authentication result 140 reflecting successful authentication. For example, the if account application 113 may permit a payment to be submitted for the account. As additional examples, the account application 113 may permit a balance transfer, address change, or any other type of account-related operation. As another example, the authentication application 123 may transmit instructions to the web browser 115 that cause the web browser 115 and/or the OS 112 to download and install an instance of the account application 113 on the device 110.

Figure 2A:
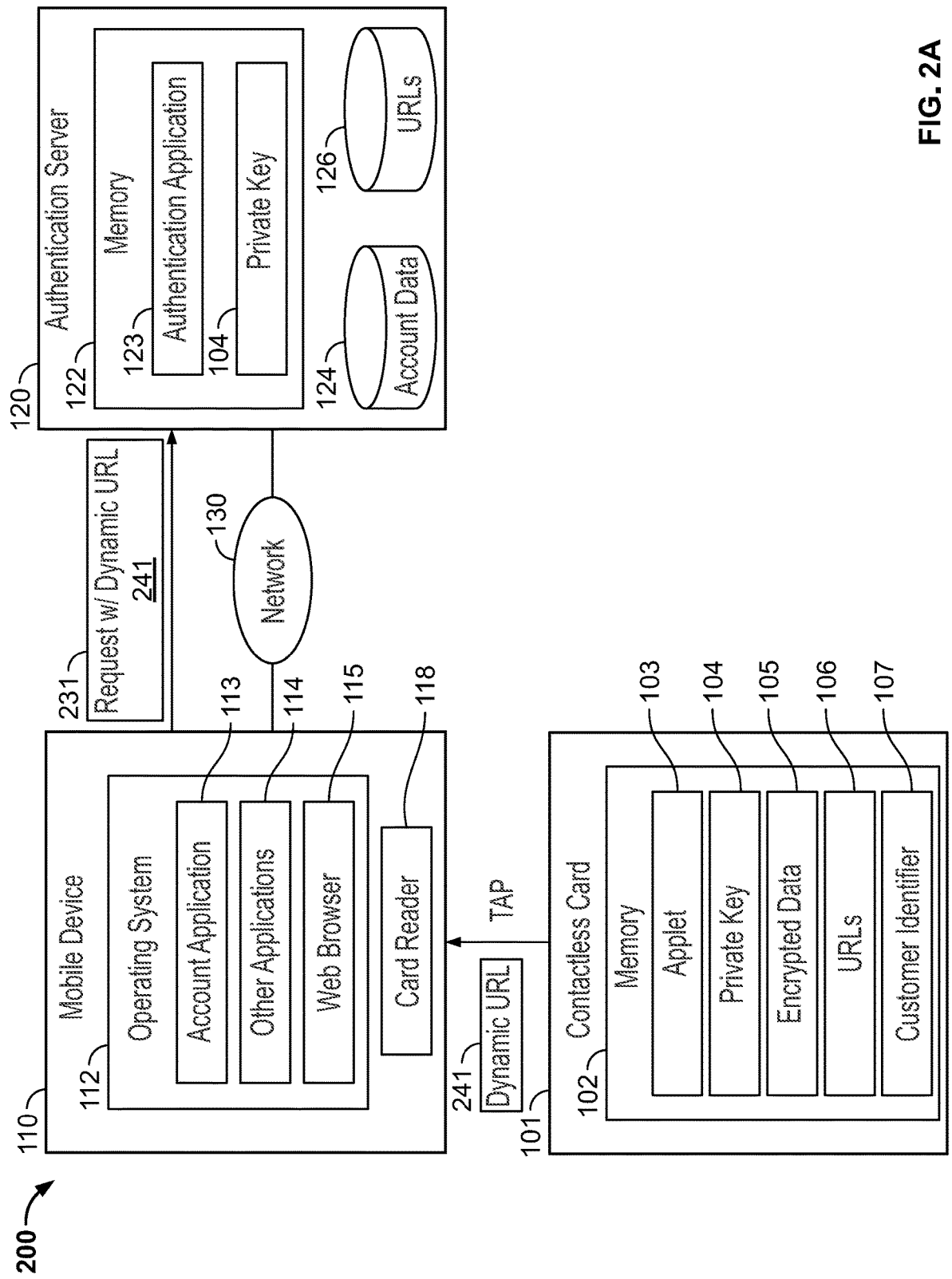
FIGS. 2A-2B illustrate embodiments of a system for URL-based authentication of payment cards.

FIG. 2A illustrates a system 200 for URL-based authentication of contactless cards 101, according to one embodiment. As shown, the system 200 includes a contactless card 101, a device 110, and the server 120 of FIGS. 1A-1C. Generally, FIGS. 2A-2C reflect embodiments where the contactless card 101 generates a "dynamic" URL for authentication by the server 120. Generally, in such embodiments, the URLs 126 and/or account data 124 may include, for each contactless card 101, some data used to facilitate dynamic URL authentication. For example, the URLs 126 and/or account data 124 may include a customer ID 107 of the customer associated with the contactless card, one or more card IDs assigned to the contactless card 101, algorithms used by the applet 103 to generate data, etc.

As shown, the card 101 may be tapped to the device 110, which may cause the applet 103 to generate a dynamic URL 241 for authentication. The applet 103 may use any suitable logic to generate a dynamic URL and/or dynamic parameters of the URL (e.g., a dynamic card ID). For example, the applet 103 may use a hash function, encryption function, random number generator, or any other logic to produce an alphanumeric string of suitable length (e.g., 256 bits, 128 bits, etc.) as the dynamic card ID. In some embodiments, the applet 103 selects a URL 106-1 that includes a base portion of a URL (e.g., "http://www.example.com"), and generates a card ID that is appended to the base portion of the URL as a parameter (e.g., "cardid=ABC123"). In other embodiments, the applet 103 is programmed to generate the entire URL, including the base portion and the card ID portion.

For example, the applet 103 of the contactless card 101 may use a cryptographic algorithm to generate a cryptographic card ID based at least in part on the private key 104 and the customer ID 107 stored in the memory 102 of the contactless card 101. For example, the applet 103 may encrypt the customer ID 107 using the private key 104 and a cryptographic algorithm. Generally, the applet 103 may use any type of cryptographic algorithm and/or system to generate the cryptographic card ID, and the use of a specific cryptographic algorithm as an example herein should not be considered limiting of the disclosure. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES128; a symmetric HMAC algorithm, such as HMAC-SHA-256; and a symmetric CMAC algorithm such as AES-CMAC. In some embodiments, the applet 103 may perform encryption using a key diversification technique to generate the cryptographic payload. Examples of key diversification techniques are described in U.S. patent application Ser. No. 16/205,119, filed Nov. 29, 2018. The aforementioned patent application is incorporated by reference herein in its entirety.

In key diversification examples, the contactless card 101 and the server 120 may maintain a counter value. Generally, the counter value comprises a value that is synchronized between a given contactless card 101 and server 120. The counter value may comprise a number that changes each time data is exchanged between the contactless card 101 and the server 120 (and/or the contactless card 101 and the mobile device 110). When preparing to send data (e.g., to the server 120 and/or the mobile device 110), the applet 103 of the contactless card 101 may increment the counter value. The contactless card 101 may then provide the private key 104 and the counter value as input to a cryptographic algorithm, which produces a diversified key as output. The contactless card 101 may then encrypt the data (e.g., the customer ID 107 and/or any other data) using the diversified key and the data as input to the cryptographic algorithm. For example, encrypting the customer ID 107 with the diversified key may result in an encrypted customer ID. When receiving the encrypted data (e.g., the encrypted customer ID 107), the server may increment the counter value Although the customer ID 107 is used as an example of data that may be encrypted to form the cryptographic card ID, other data elements may be encrypted. For example, a static URL, a card ID, the PAR, or any other attribute of the account holder may be encrypted to generate the cryptographic card ID. Embodiments are not limited in this context.

Generally, once computed, the applet 103 of the contactless card 101 may include the cryptographic card ID as a parameter of the URL, which is shown as the dynamic URL 241 in FIG. 2A. In some embodiments, the account application 113 instructs the applet 103 to include a parameter associated with a requested user operation (e.g., viewing account balance) as a parameter of the dynamic URL 241. The applet 103 may then include the parameter in the dynamic URL 241. In addition and/or alternatively, the applet 103 may include, as a parameter of the dynamic URL 241, an indication of the algorithm used to generate the card ID. Doing so may assist the authentication application 123 in authenticating the dynamic URL 241. As another example, the applet 103 may include, as a parameter of the URL 241, an indication that the card ID is the PAR value. In some embodiments, the dynamic URL 241 may be directed to the authentication application 123 and/or authentication server 120 and includes at least the card ID as a parameter. As stated, however, if the account application 113 is not installed on the device 110, the OS 112 may instruct the applet 103 to generate URL. Logic of the applet 103 may then determine to generate the dynamic URL 241. In one embodiment, the applet 103 may store the PAR value. In another embodiment, the card 101 includes multiple applets, and the applet 103 may receive the PAR value from another applet (e.g., an EMV applet).

The applet 103 may then transmit the dynamic URL 241 to the mobile device 110. In some embodiments, the OS 112 of the device 110 launches an appropriate application (e.g., account application 113, other application 114, and/or web browser 115) and provides the URL 241 to the launched application. In embodiments where the account application 113 is launched (or is already executing in the foreground of the OS 112), the OS 112 may provide the URL 241 to the account application 113, which may provide additional data as parameters of the URL 241. For example, the account application 113 may insert GPS coordinates as parameters of the URL 241, indications of one or more requested operations as parameters, etc. Regardless of the application launched, opened, or otherwise invoked by the OS 112, a request 231 may comprise the dynamic URL 241, which may generally transmit the dynamic URL 241 to the authentication server 120. As with static URLs, the launched application may further transmit the dynamic URL 241 to an associated server (e.g., merchant application 114 may transmit the dynamic URL 241 to a merchant server for authentication). In embodiments where the account application 113 is not installed on the device 110, the URL 241 may cause the OS 112 to launch the web browser 115 and cause the web browser 115 to access the URL 241 (e.g., by generating the request 231).

The authentication application 123 may then attempt to authenticate the URL 241. For example, if the URL 241 includes the encrypted card ID as the cryptographic card ID, the authentication application 123 may decrypt the cryptographic card ID using a copy of the private key 104 stored in the memory 122 of the server 120. The private key 104 may be identical to the private key 104 stored in the memory 102 of the contactless card 101, where each contactless card 101 is manufactured to include a unique private key 104 (and the server 120 stores a corresponding copy of each unique private key 104). Therefore, if the authentication application 123 successfully decrypts the cryptographic card ID, the authentication application 123 may determine whether the decrypted card ID matches an expected card ID in the account data 124 and/or the URLs 126. If a match exists, the authentication application 123 verifies or authenticates the card ID. As another example, if the encrypted PAR is used as the card ID, the authentication application 123 may decrypt the PAR and determine whether the PAR matches an expected PAR in the account data 124 and/or the URLs 126. If a match exists, the authentication application 123 verifies or authenticates the PAR.

As another example, if the URL 241 includes the encrypted customer ID 107 as the cryptographic card ID, the authentication application 123 may decrypt the encrypted customer ID 107 using the copy of the private key 104 stored in the memory 122 of the server 120. Therefore, if the authentication application 123 successfully decrypts the encrypted customer ID 107, the authentication application 123 may determine whether the decrypted customer ID 107 matches customer ID 107 in the account data 124 and/or the URLs 126. If a match exists, the authentication application 123 verifies or authenticates the dynamic URL 241.

As another example, if the customer ID 107 and/or the PAR is encrypted using key diversification, the authentication application 123 may increment the counter value associated with the contactless card. The authentication application 123 may then provide the private key 104 and counter value as input to the cryptographic algorithm, which produces the diversified key as output. The resulting diversified key may correspond to the diversified key generated by the contactless card 101, which may be used to decrypt the encrypted customer ID 107 and/or the PAR. Therefore, the authentication application 123 may successfully decrypt the encrypted data, thereby verifying the encrypted data.

As another example, if the applet 103 uses a hash of the customer ID 107 (or other piece of data, such as the PAR) to generate the card ID, the authentication application 123 may compute a hash of the customer ID 107 using the same hash function used by the applet 103. Doing so produces an expected card identifier, which should match the card ID generated by the applet using the hash function. If the received card identifier matches the expected card identifier, the authentication application 123 authenticates the card ID.

As stated, in some embodiments, the authentication application 123 may receive location data in the request 231. If the location data is received, the authentication application 123 determines whether the location data reflects that the device 110 and/or card 101 is within a threshold distance of one or more known locations associated with the account (e.g., a billing address, home address, shipping address, etc.).

Figure 2B:
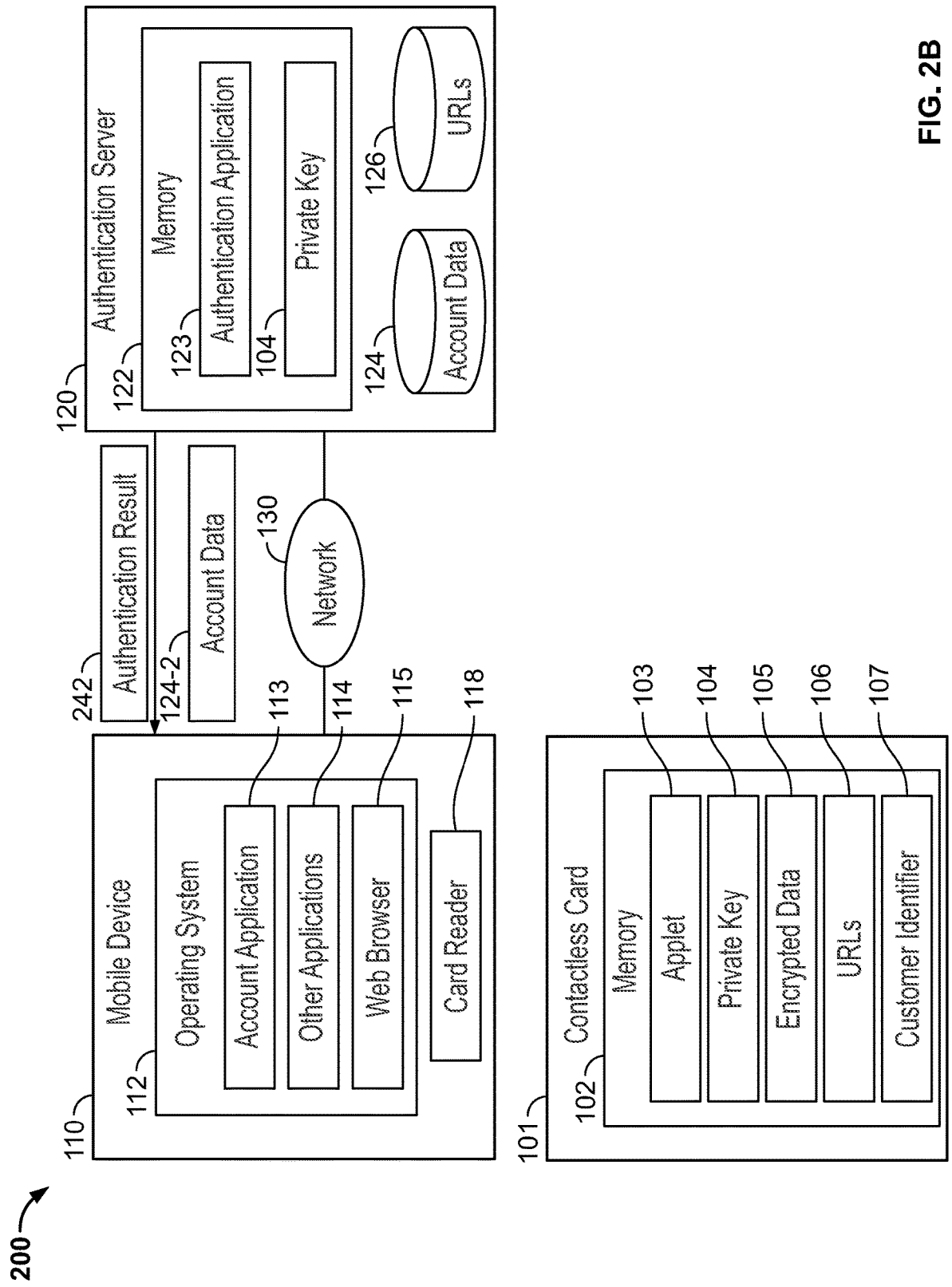

FIG. 2B depicts an embodiment where the authentication application 123 successfully authenticates the card ID specified as a parameter of the dynamic URL 241 of the request 231, e.g., by determining a match of the card ID and an expected card ID generated by the authentication application 123, or determining a match of the card ID and one or more card IDs in the account data 124 and/or URLs 126. As shown, the authentication application 123 transmits an authentication result 242 which indicates that the authentication was successful. In the depicted embodiment, because the authentication was successful, the authentication application 123 further transmits account data 124-2 to the device 110. The account data 124-1 may be for the account associated with the contactless card 101. In some embodiments, the authentication application 123 selects the account data 124-2 based on default data types associated with URL-based authentication (e.g., account holder name, account balance, etc.). In other embodiments, the authentication application 123 selects the account data 124-2 based on a parameter in the request 231. For example, the parameter of the dynamic URL 241 may specify to return an account balance. In such an example, the authentication application 123 may select the account balance from the account data 124 as the account data 124-2.

As with static URLs, any number and types of operations may be performed based on successful authentication of the dynamic URL 241 and/or the associated card ID. For example, the authentication application 123 may instruct the account application 113, other application 114, and/or web browser 115 to capture authentication credentials (e.g., biometric data, username/password, etc.) for the account. The captured credentials may then be transmitted to the authentication application 123 for verification and/or verified locally by the account application 113. As another example, the authentication application 123 may cause a one-time use virtual account number (VAN) to be generated for the account. The VAN and associated expiration date and card verification value (CVV) may then be transmitted to the device 110. In some embodiments, the received VAN, expiration date, and/or CVV may be autofilled to one or more forms. In some embodiments, the VAN, expiration date, and/or CVV may be copied to a clipboard of the OS 112 by the account application 113, other application 114, and/or web browser 115. Embodiments are not limited in these contexts. As another example, one or more operations may be performed based on the received authentication result 242 reflecting successful authentication. For example, the account application 113 may permit a payment to be submitted for the account. As additional examples, the account application 113 may permit a balance transfer, address change, or any other type of account-related operation. As stated, in other examples, the authentication application 123 may transmit instructions to the web browser 115 that cause the web browser 115 and/or the OS 112 to download and install an instance of the account application 113 on the device 110.

As stated, in some embodiments, the applet 103 may encrypt the card ID of a dynamic URL and/or static URL. In such embodiments, the applet 103 may include an indication that the card ID is encrypted as a parameter of the URL, thereby allowing the authentication application 123 to determine the card ID is encrypted. Furthermore, in such embodiments, the applet 103 encode the encrypted data according to an encoding format compatible with URLs prior to including the encrypted card ID as a parameter of the corresponding URL. For example, the encrypted card ID may be a string of binary data (e.g., zeroes and ones), which may not be compatible with URLs. Therefore, the applet 103 may encode the encrypted card ID to the American Standard Code for Information Interchange (ASCII) base64 encoding format. Doing so represents the binary encrypted card ID in an ASCII string format by translating it into a radix-64 representation (e.g., "ABC123" in the previous example). The authentication application 123 may then decode the ASCII string to binary before performing any decryption.

Figures 3A, 3B:
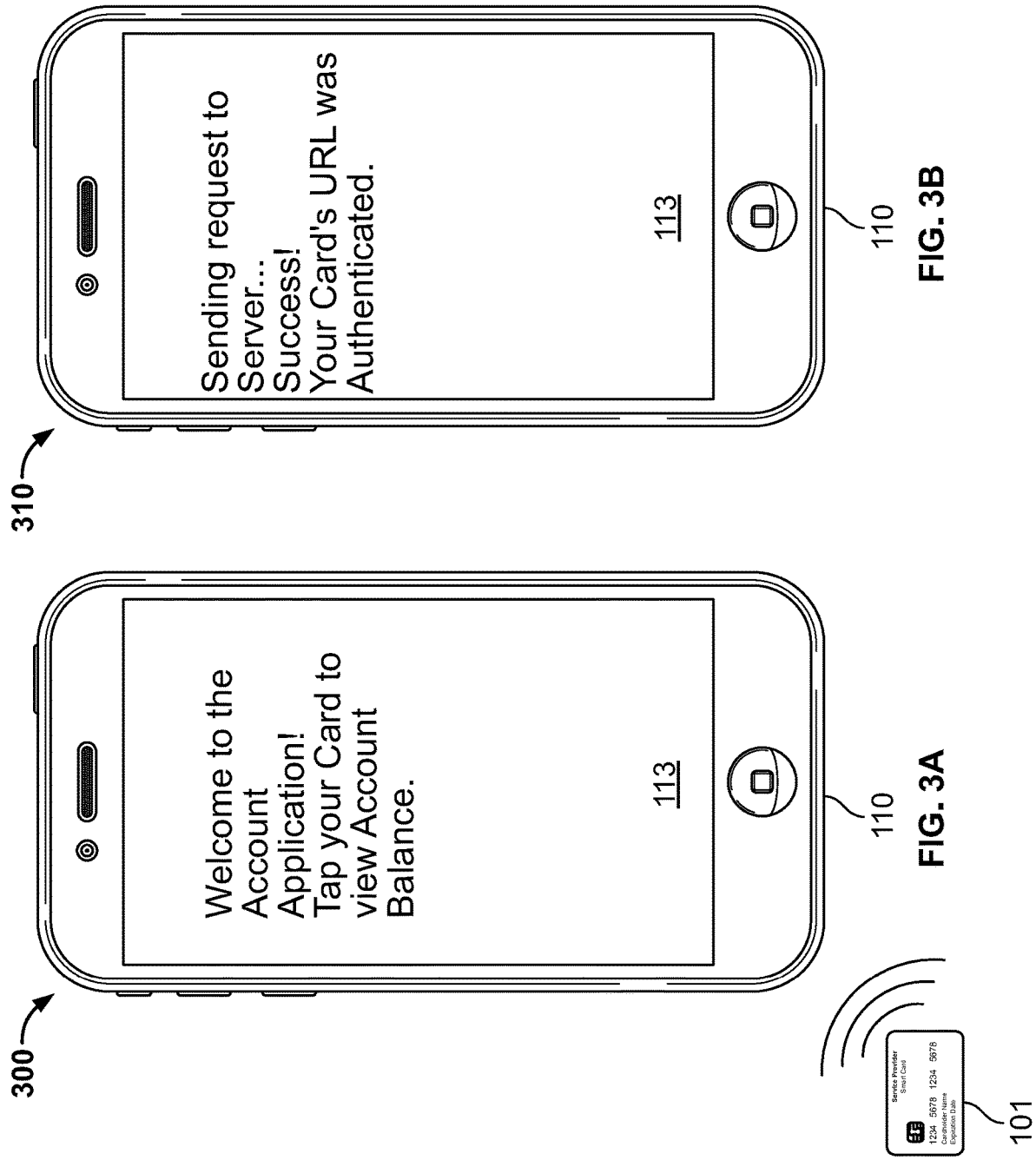
FIGS. 3A-3C illustrate embodiments of URL-based authentication of payment cards.

FIG. 3A is a schematic 300 depicting an example embodiment of tapping the contactless card 101 for URL-based authentication. As shown, the account application 113 of the device 110 displays a page specifying to tap the contactless card 101 to view an account balance. As stated, once the contactless card 101 is tapped to the mobile device 110, the account application 113 transmits, via the card reader 118 (e.g., via NFC, Bluetooth, RFID, and/or the EMV protocol etc.), an indication to the contactless card 101. The indication may specify to provide a URL for authentication. The URL may be a dynamically generated URL and/or a static URL selected from the URLs 106. However, in some embodiments, the contactless card 101 causes the applet 103 to provide the URL without requiring instructions received from the mobile device 110. Regardless of whether the URL is dynamically generated and/or selected from the static URLs 106, the URL includes at least one card ID as a parameter. As stated, the applet 103 may further provide additional parameters in the URL.

FIG. 3B is a schematic 310 illustrating an embodiment where the account application 113 receives a URL from the contactless card. As stated, the account application 113 may optionally add additional parameters to the received URL. The account application 113 may then transmit the received URL to the authentication server 120. The authentication application 123 may then attempt to validate or authenticate the received URL. For example, the authentication application 123 may determine whether the received URL matches an expected URL. The expected URL may be any URL in the URLs 126 and/or account data 124. As another example, the authentication application 123 may extract the card ID from the received URL and determine whether the extracted card ID matches any card IDs specified in the URLs 126 and/or account data 124. In a dynamic URL example, the authentication application 123 may attempt to recreate the card ID of the dynamic URL using the same algorithm as the applet 103 and determine whether the card ID of the dynamic URL matches the card ID recreated by the authentication application 123. As stated, in some embodiments, the authentication application 123 may decrypt the card ID if encrypted.

Figure 3C:
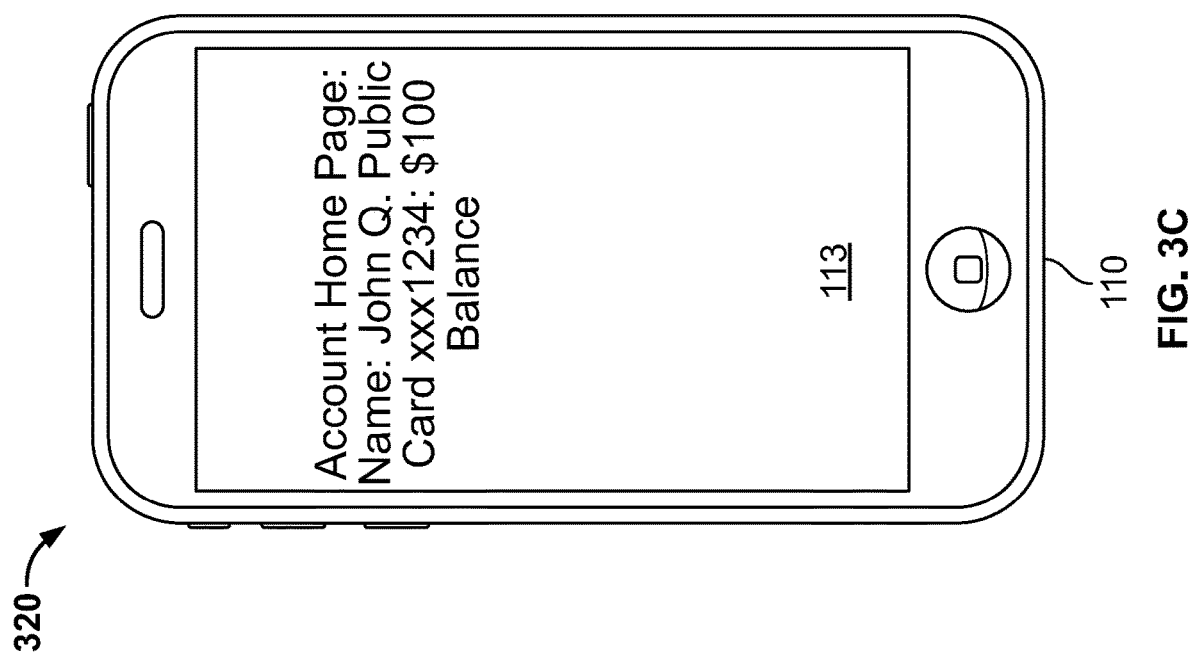

FIG. 3C is a schematic 320 depicting an embodiment where the authentication application 123 successfully authenticates the URL received from the account application 113. As shown, the account application 113 displays information received from the authentication application 123 responsive to the successful authentication of the URL. For example, the account application 113 displays the account holder's name and the balance of an account, which may be received from the authentication application 123.

Figures 4A, 4B:
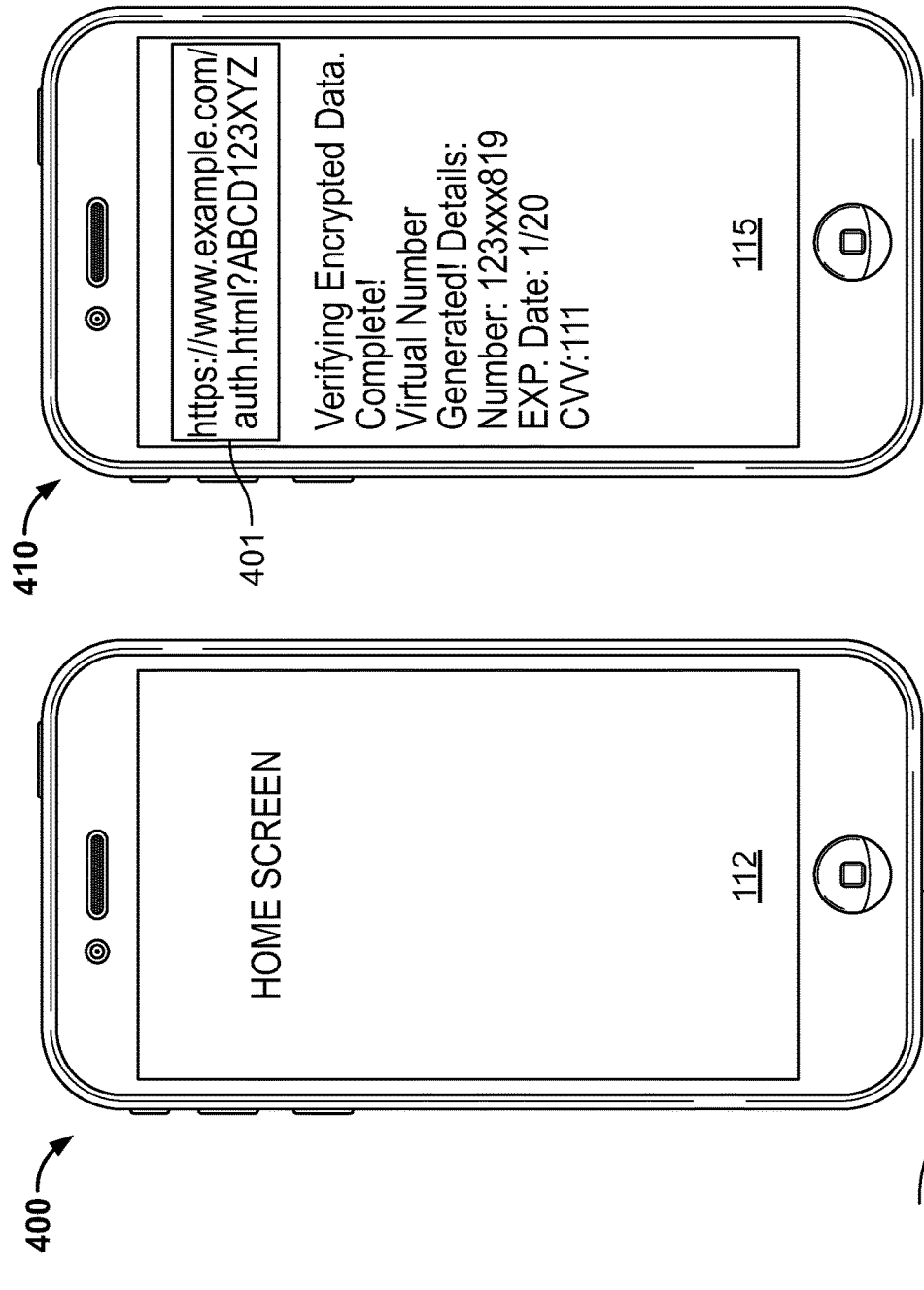
FIGS. 4A-4B illustrate embodiments of URL-based authentication of payment cards.

FIG. 4A is a schematic 400 illustrating an embodiment where the device 110 outputs a home page of an OS 112 when the contactless card 101 is tapped to the device 110. As stated, when the card 101 is tapped to the device 110, the applet 103 may provide a static URL and/or a dynamic URL to the device 110. For example, as stated, the applet 103 may generate a dynamic URL with a card ID that is encrypted using the private key 104 (and/or a diversified key) of the contactless card 101. The applet 103 may then transmit the URL to the mobile device 110. Once received, the OS 112 may perform an action, e.g., launching the account application 113, other application 114, and/or web browser 115 that is registered with the OS 112 to open the URL. Advantageously, doing so provides a solution for URL-based authentication that does not require an active application (e.g., the account application 113, other applications 114, and/or the web browser 115) running in the foreground of the OS 112. Advantageously, such solutions do not require the device 110 to include an instance of the account application 113 to be installed on the device. Furthermore, in such embodiments, the URL-based authentication may facilitate the download and installation of an instance of the account application 113 on the device 110.

FIG. 4B is a schematic 410 depicting an embodiment where the OS 112 opens the web browser 115 responsive to receiving the dynamic URL from the contactless card 101. As stated, in some embodiments, the device 110 does not include an instance of the account application 113. In such embodiments, the dynamic URL causes the OS 112 to open the web browser. Address field 401 of the web browser 115 reflects the URL received from the contactless card. In the example depicted in FIG. 4B, the applet 103 may generate the example encrypted string of "ABCD123XYZ" using the private key 104 and the customer ID 107 (and/or the PAR value). The applet 103 may then generate a URL directed to the authentication application 123, where the URL includes the encrypted string as a card ID parameter of the URL. In the example depicted in FIG. 4B, the URL may be "https:/// www.example.com/auth.html?ABCD123XYZ". The web browser 115 may then access the URL, which causes the authentication application 123 to extract the card ID parameter from the URL for verification.

Generally, the authentication application 123 may decrypt the card ID using the private key 104 assigned to the contactless card 101 to verify the decrypted card ID. As stated, the authentication application 123 may decode the encrypted card ID prior to decryption. The authentication application 123 may then determine whether the decrypted card ID matches a known card ID (e.g., one of a plurality of card IDs and/or URLs specified in the URLs 126 and/or the account data 124). FIG. 4B reflects an embodiment where the authentication application 123 determines the decrypted card ID matches a known card ID. As such, the authentication application 123 transmits an indication of success to the web browser 115. Furthermore, as shown, the authentication application 123 has generated a virtual account number, expiration date, and CVV, which are outputted for display in the web browser 115. As shown in FIG. 4B, the web browser 115 includes the indication of successful URL-based authentication, the virtual account number, expiration date, and CVV.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some implementations. In addition, the given logic flow may be implemented by a hardware element, a software element executed by a processor, or any combination thereof. The embodiments are not limited in this context.

Figure 5:
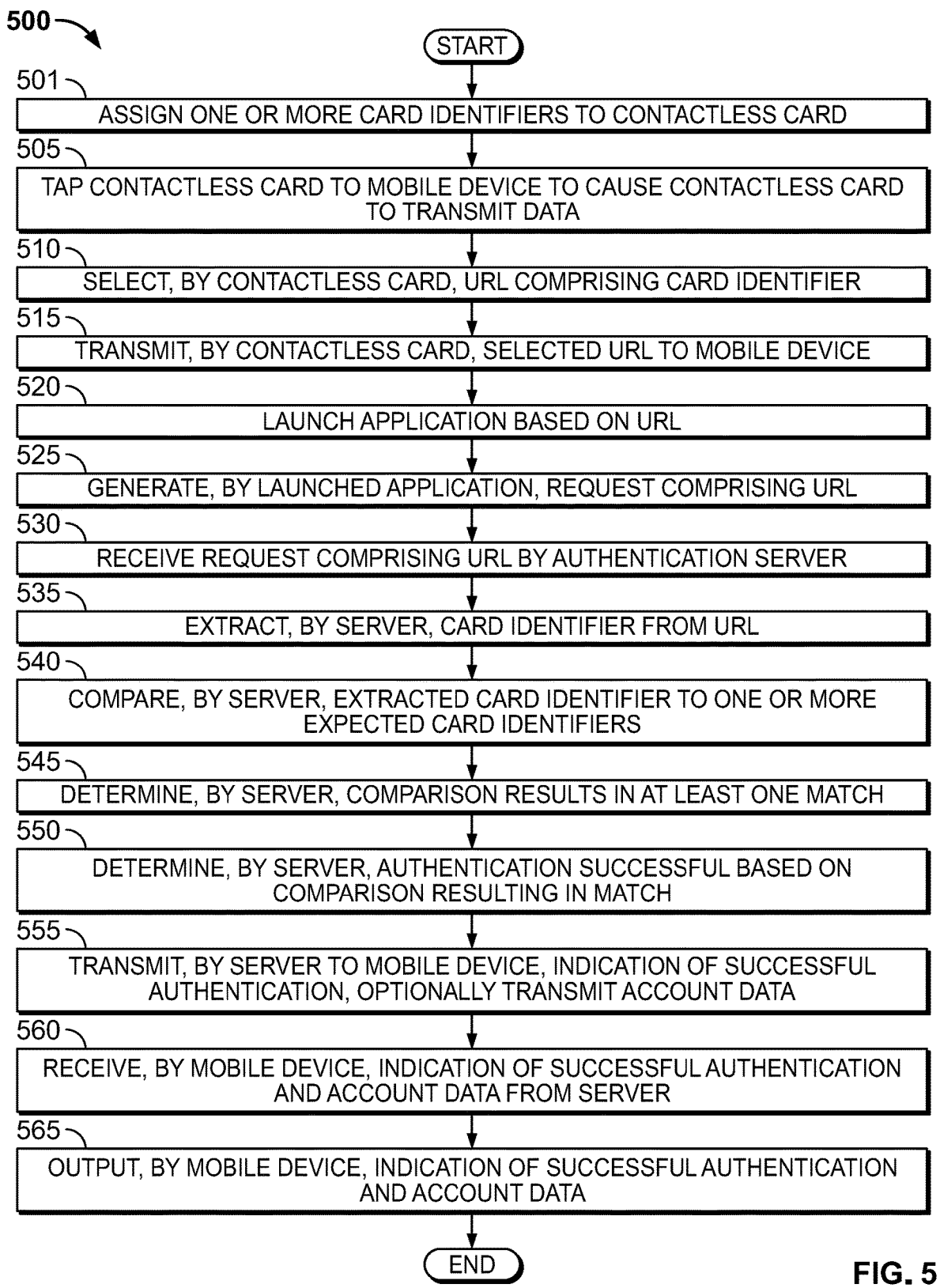
FIG. 5 illustrates an embodiment of a first logic flow.

FIG. 5 illustrates an embodiment of a logic flow 500. The logic flow 500 may be representative of some or all of the operations executed by one or more embodiments described herein. For example, the logic flow 500 may include some or all of the operations to provide URL-based authentication for payment cards using static URLs. Embodiments are not limited in this context.

As shown, the logic flow 500 begins at block 501, where one or more URLs are assigned to a contactless payment card when the payment card is manufactured. For example, one or more unique URLs 106 may be assigned to a plurality of different payment cards, such as the contactless cards 101. Generally, each URL includes, as a parameter, at least one card ID. The card ID is any alphanumeric string that uniquely identifies each contactless card and may be generated using any suitable function. Therefore, when a card is manufactured, the generated URLs may be programmed as URLs 106 in the memory 102 of the contactless card 101. Furthermore, the generated URLs may be stored in the URLs 126 of the server 120, where each entry in the URLs 126 comprises a URL and an associated card (and/or account associated with a card). As stated, the card ID may be any value, such as a customer ID, a PAR value, or any other piece of data.

At block 505, a user taps the contactless card 101 to the device 110 to cause the contactless card 101 to provide a URL. The device 110 may be in any active state. For example, the device 110 may display a home screen of the OS 112. As another example, the device 110 may display the account application 113 in a foreground of the OS 112. At block 510, the applet 103 of the contactless card selects a static URL 106-1 from the URLs 106 stored in the contactless card 101. The selected URL 106-1 includes a card identifier as a parameter of the URL. As stated, the applet 103 may select from multiple URLs 106 using selection logic, offsets, or any other selection technique. The URL may be a universal link URL which at least in part causes a predefined page of the account application 113 and/or another application 114 to be opened when followed. At block 515, the applet 103 may transmit the selected URL 106-1 including the card identifier to the mobile device 110. At block 520, the OS 112 of the device, responsive to receiving the URL 106-1, launches a client application associated with the URL 106-1. For example, the OS 112 may open the account application 113, one of the other applications 114, and/or the web browser 115 responsive to receiving the URL 106-1. In one example, the URL 106-1 is a deep link URL that is registered to an application, such as the account application 113 and/or one of the other applications 114.

At block 525, the application launched at block 520 generates a request comprising the URL 106-1 received from the card 101. For example, the account application 113 may generate a request directed to the authentication application 123 specifying the URL 106-1, where the request specifies to authenticate the URL 106-1. As another example, the web browser 115 may generate an HTTP request specifying the URL 106-1, which is directed to the authentication application 123 and causes the authentication application 123 to authenticate the URL 106-1. In some embodiments, additional data may be added to the URL 106-1, such as location data describing a location of the device 110, a requested operation (e.g., viewing account balances, virtual account number generation, etc.), and any other parameters to facilitate the authentication operations performed by the authentication application 123.

At block 530, the authentication application 123 receives the request comprising the URL 106-1 generated at block 540. At block 535, the authentication application 123 extracts the card ID parameter from the URL 106-1. In some embodiments where the card ID is encrypted, the authentication application 123 decrypts the card ID using the private key 104. At block 540, the authentication application 123 compares the card ID to one or more expected card ID values. For example, the authentication application 123 may query the URLs 126 and/or account data 124 to return results matching the card ID value. In some embodiments, the entire URL 106-1, rather than the card ID portion, is searched for a match in the URLs 126 and/or account data 124. If a match is not found, the authentication application 123 determines that the authentication fails. At block 545, the authentication application 123 determines that at least one match exists between the card ID (and/or URL 106-1) and one or more card IDs (and/or URLs) in the URLs 126 and/or account data 124. As such, the authentication application 123 may authenticate the URL 106-1 and determine the authentication is successful at block 550.

At block 555, the authentication application 123 may transmit an indication of the successful authentication to the requesting application on the device 110. Furthermore, the authentication application 123 may optionally transmit additional data to the device 110. For example, if a parameter of the URL 106-1 specifies to provide an account balance, the authentication application 123 may provide the current account balance to the device 110. At block 560, the device 110 receives the indication of success and the optional data provided by the authentication application 123. At block 565, the device 110 outputs the indication of successful authentication and any data received. The device 110 may further permit additional operations, such as copying data to a clipboard of the OS 112, installing applications on the device 110, viewing account balances, transferring funds, etc.

Figure 6:
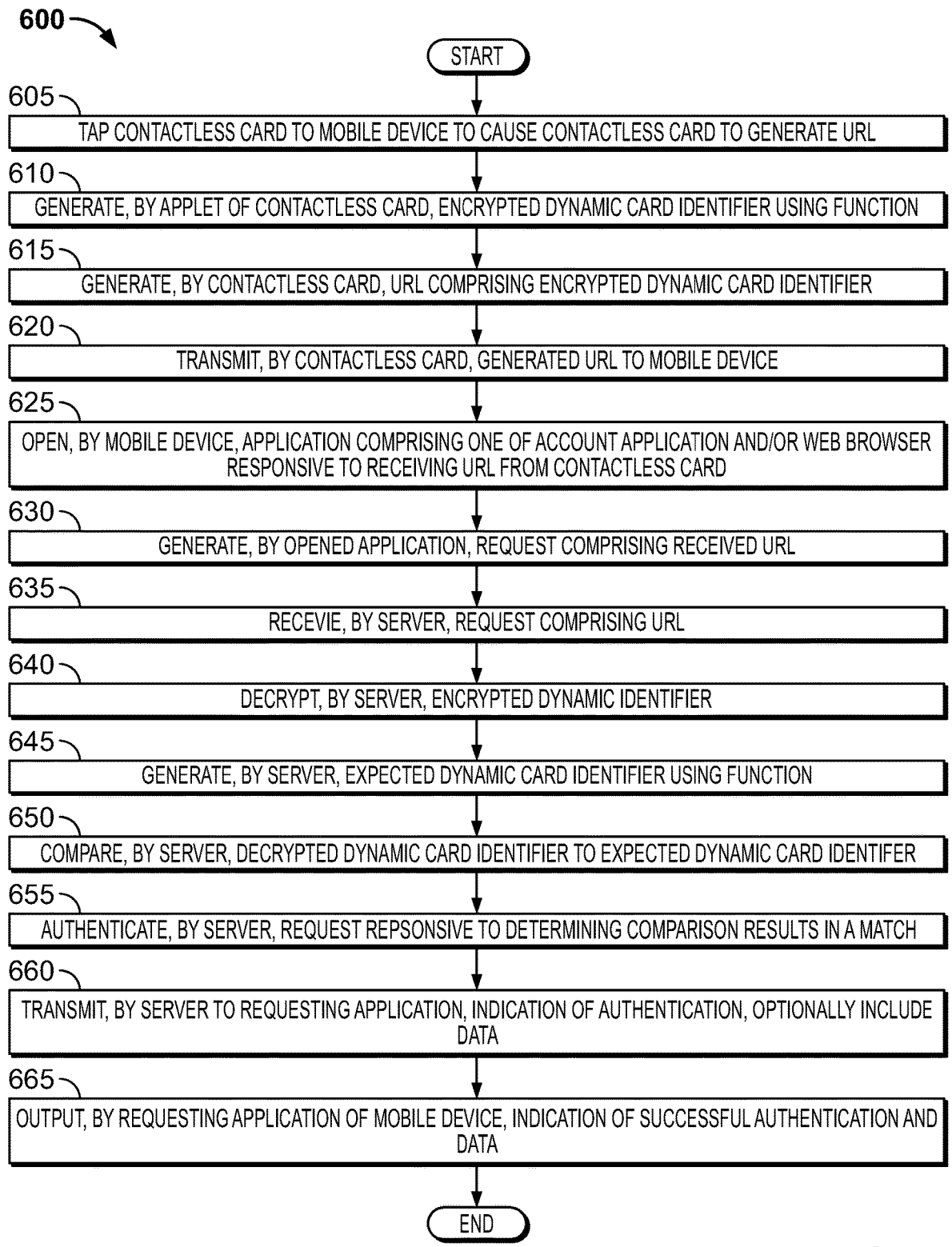
FIG. 6 illustrates an embodiment of a second logic flow.

FIG. 6 illustrates an embodiment of a logic flow 600. The logic flow 600 may be representative of some or all of the operations executed by one or more embodiments described herein. For example, the logic flow 600 may include some or all of the operations to provide URL-based authentication for payment cards using dynamic URLs. Embodiments are not limited in this context.

As shown, the logic flow 600 begins at block 605, where a user taps the contactless card 101 to the device 110 to cause the contactless card 101 to provide a URL. The device 110 may be in any active state. For example, the device 110 may display a home screen of the OS 112. As another example, the device 110 may display the account application 113, one of the other applications, and/or the web browser 115 in a foreground of the OS 112. At block 610, the applet 103 of the contactless card 101 generates an encrypted dynamic card ID using a function. The function may be a hash function, an encryption function, a random number generator, or any other suitable function. In some embodiments, the generation of the encrypted dynamic card ID comprises encrypting the customer ID 107 of the contactless card 101 using the private key 104. In some embodiments, the generation of the encrypted dynamic card ID comprises the hash function (or some other function) computing an output (e.g., based on the customer ID 107) and encrypting the output using the private key 104.

At block 615, the applet 103 generates a URL comprising the encrypted card ID generated at block 610. For example, the applet 103 may append the encrypted card ID as a parameter to a URL directed to the authentication application 123. The applet 103 may further append other parameters to the URL, such as requested operations, functions used to compute the encrypted card ID, etc. In some embodiments, the applet 103 may store the generated URL in the database of URLs 106. At block 620, the applet 103 transmits the URL generated at block 615 to the device 110. At block 625, the OS 112 may open a client application responsive to receiving the URL. For example, the OS 112 may open the account application 113, one of the other applications 114, and/or the web browser 115. At block 630, the application opened by the OS 112 at block 625 generates a request comprising the URL received from the contactless card 101. The request may be any type of request, such as an HTTP request comprising the URL.

At block 635, the authentication application 123 receives the request from the device 110. At block 640, the authentication application 123 decrypts the encrypted card ID in the URL, e.g., using the instance of the private key 104 stored by the server 120. At block 645, the authentication application 123 generates an expected dynamic card identifier. For example, the authentication application 123 may use the hash function to compute an expected hash value (e.g., by hashing the customer ID 107). At block 650, the authentication application 123 compares the decrypted card ID to the expected dynamic card ID. At block 655, the authentication application 123 authenticates the request based on the decrypted card ID matching the expected dynamic card ID.

At block 660, the authentication application 123 may transmit an indication of the successful authentication to the requesting application on the device 110. Furthermore, the authentication application 123 may transmit additional data to the device 110. For example, if a parameter of the URL generated by the applet 103 (and/or modified by the device 110) specifies to provide a virtual account number, the authentication application 123 may generate the virtual account number and provide the virtual account number, expiration date, and CVV to the device 110. At block 665, the device 110 receives the indication of success and the data provided by the authentication application 123. The requesting application on the device 110 may output the received indication of successful authentication and any data received. The device 110 may further permit additional operations, such as copying the virtual account number to a clipboard of the OS 112, installing applications on the device 110, viewing account balances, transferring funds, etc.

Figure 7A:
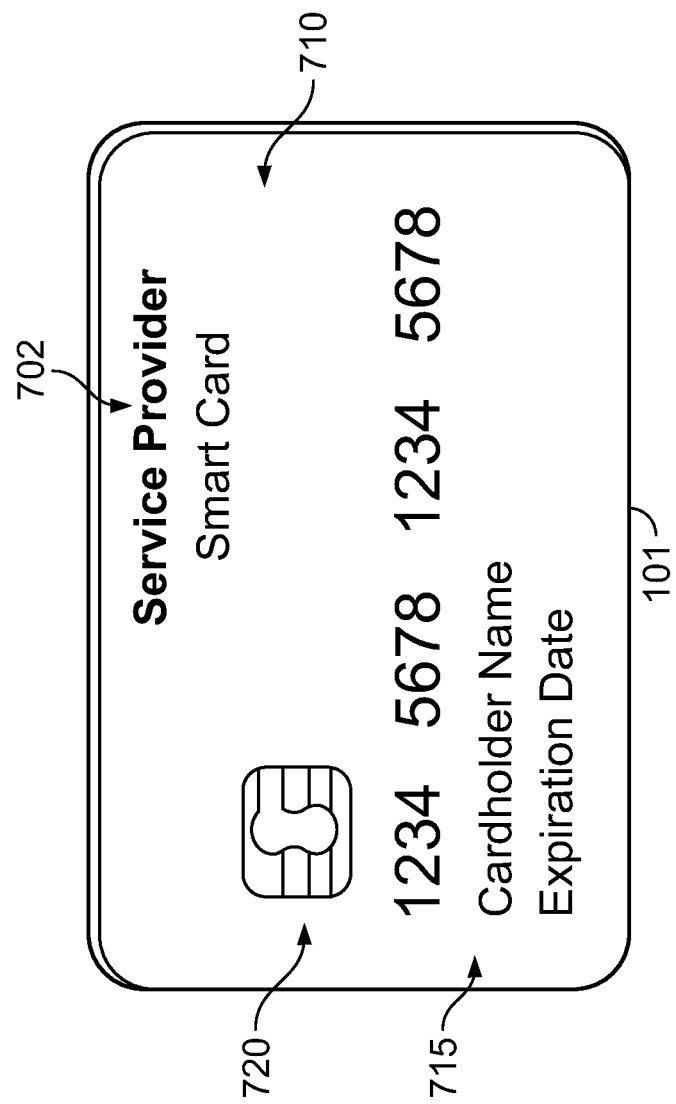
FIGS. 7A-7B illustrate an example contactless card.

FIG. 7A illustrates a contactless card 101, which may comprise a payment card, such as a credit card, debit card, and/or a gift card. As shown, the contactless card 101 may be issued by a service provider 702 displayed on the front or back of the card 101. In some examples, the contactless card 101 is not related to a payment card, and may comprise, without limitation, an identification card. In some examples, the payment card may comprise a dual interface contactless payment card. The contactless card 101 may comprise a substrate 710, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 101 may have physical characteristics compliant with the ID-1 format of the ISO/IEC 7810 standard, and the contactless card may otherwise be compliant with the ISO/IEC 14443 standard. However, it is understood that the contactless card 101 according to the present disclosure may have different characteristics, and the present disclosure does not require a contactless card to be implemented in a payment card.

The contactless card 101 may also include identification information 715 displayed on the front and/or back of the card, and a contact pad 720. The contact pad 720 may be configured to establish contact with another communication device, such as the mobile devices 110, a user device, smart phone, laptop, desktop, or tablet computer. The contactless card 101 may also include processing circuitry, antenna and other components not shown in FIG. 7A. These components may be located behind the contact pad 720 or elsewhere on the substrate 710. The contactless card 101 may also include a magnetic strip or tape, which may be located on the back of the card (not shown in FIG. 7A).

Figure 7B:
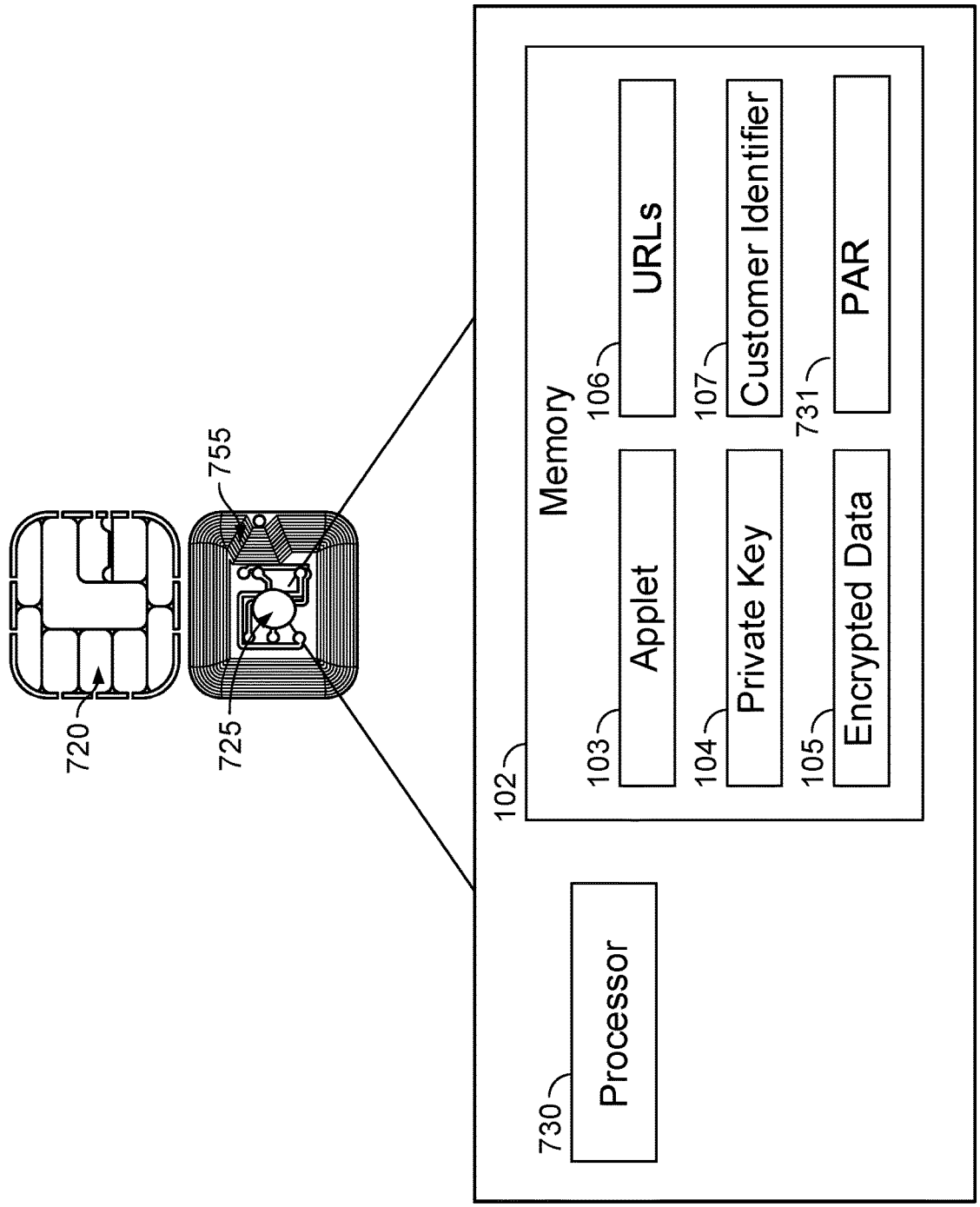

As illustrated in FIG. 7B, the contact pad 720 of contactless card 101 may include processing circuitry 725 for storing and processing information, including a microprocessor 730 and the memory 102. It is understood that the processing circuitry 725 may contain additional components, including processors, memories, error and parity/CRC checkers, data encoders, anti-collision algorithms, controllers, command decoders, security primitives and tamper proofing hardware, as necessary to perform the functions described herein.

The memory 102 may be a read-only memory, write-once read-multiple memory or read/write memory, e.g., RAM, ROM, and EEPROM, and the contactless card 101 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programmed many times after leaving the factory. A read/write memory may also be read many times after leaving the factory.

The memory 102 may be configured to store one or more applets 103, the private key 104, encrypted data 105, one or more URLs 106, one or more customer IDs 107, and a PAR value 731. The one or more applets 103 may comprise one or more software applications configured to execute on one or more contactless cards, such as a Java® Card applet. However, it is understood that applets 103 are not limited to Java Card applets, and instead may be any software application operable on contactless cards or other devices having limited memory. The customer ID 107 may comprise a unique alphanumeric identifier assigned to a user of the contactless card 101, and the identifier may distinguish the user of the contactless card from other contactless card users. In some examples, the customer ID 107 may identify both a customer and an account assigned to that customer and may further identify the contactless card associated with the customer's account. In some embodiments, the applet 103 may use the customer ID 107 as input to a cryptographic algorithm with the key 104 to encrypt the customer ID 107. Similarly, the applet 103 may generate a dynamic card ID and construct a dynamic URL that includes the dynamic card ID as a parameter.

As stated, the PAR value 731 is unique to the contactless card 101 and any payment tokens generated by the card 101. The PAR 731 may comprise a unique alphanumeric identifier assigned to the contactless card 101, which distinguishes the contactless card from other contactless cards. In at least one embodiment, the PAR includes 29 alphanumeric characters. In such an embodiment, 4 characters may represent a BIN Controller Identifier, while the remaining 25 characters may represent a unique identifier which corresponds to a primary account number (PAN) of the contactless card 101. In some embodiments, the applet 103 includes the PAR 731 as the card ID parameter of one or more URLs. In some embodiments, the applet 103 may encrypt the PAR 731, e.g., with the key 104 and/or a diversified key. Similarly, the applet 103 may construct a dynamic URL that includes the encrypted PAR 731 as a parameter. The server 120 may use the PAR 731 to authenticate requests as described above. In some embodiments, a device 110 may directly read the PAR 731 using an EMV read.

The processor and memory elements of the foregoing exemplary embodiments are described with reference to the contact pad, but the present disclosure is not limited thereto. It is understood that these elements may be implemented outside of the pad 720 or entirely separate from it, or as further elements in addition to processor 730 and memory 102 elements located within the contact pad 720.

In some examples, the contactless card 101 may comprise one or more antennas 755. The one or more antennas 755 may be placed within the contactless card 101 and around the processing circuitry 725 of the contact pad 720. For example, the one or more antennas 755 may be integral with the processing circuitry 725 and the one or more antennas 755 may be used with an external booster coil. As another example, the one or more antennas 755 may be external to the contact pad 720 and the processing circuitry 725.

In an embodiment, the coil of contactless card 101 may act as the secondary of an air core transformer. The terminal may communicate with the contactless card 101 by cutting power or amplitude modulation. The contactless card 101 may infer the data transmitted from the terminal using the gaps in the contactless card's power connection, which may be functionally maintained through one or more capacitors. The contactless card 101 may communicate back by switching a load on the contactless card's coil or load modulation. Load modulation may be detected in the terminal's coil through interference. More generally, using the antennas 755, processing circuitry 725, and/or the memory 102, the contactless card 101 provides a communications interface to communicate via NFC, Bluetooth, and/or Wi-Fi communications.

As explained above, contactless cards 101 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader (e.g., the card reader 118 of the device 110), and produce an NDEF message that comprises a cryptographically secure OTP (e.g., an encrypted customer ID) encoded as an NDEF text tag.

Figure 8:
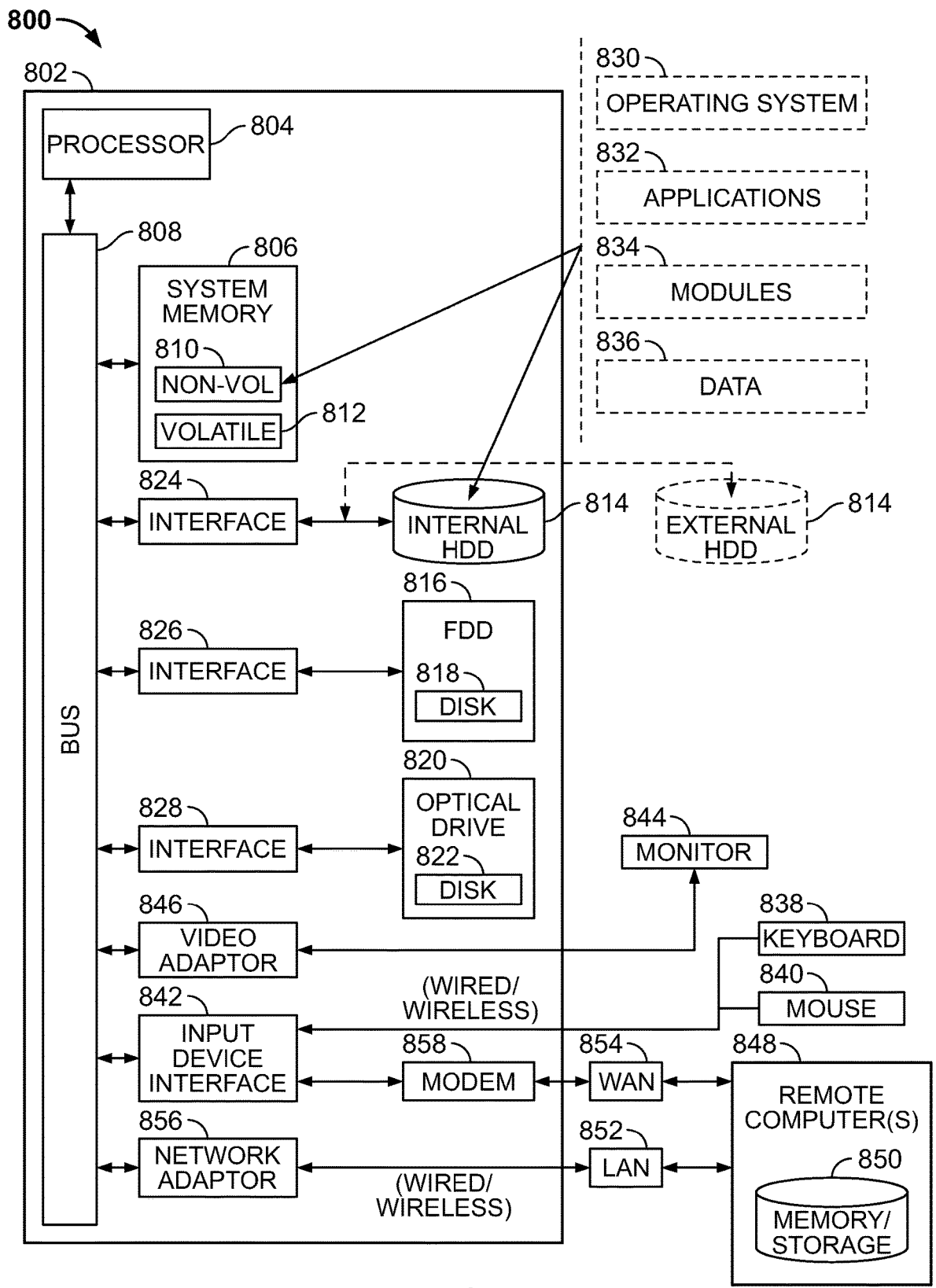
FIG. 8 illustrates an embodiment of a computing architecture.

FIG. 8 illustrates an embodiment of an exemplary computing architecture 800 comprising a computing system 802 that may be suitable for implementing various embodiments as previously described. In various embodiments, the computing architecture 800 may comprise or be implemented as part of an electronic device. In some embodiments, the computing architecture 800 may be representative, for example, of a system that implements one or more components of the system 100. In some embodiments, computing system 802 may be representative, for example, of the mobile devices 110 and/or the authentication server 120 of the system 100. The embodiments are not limited in this context. More generally, the computing architecture 800 is configured to implement all logic, applications, systems, methods, apparatuses, and functionality described herein with reference to FIGS. 1-7B.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 802 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 802.

As shown in FIG. 8, the computing system 802 comprises a processor 804, a system memory 806 and a system bus 808. The processor 804 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi-processor architectures may also be employed as the processor 804.

The system bus 808 provides an interface for system components including, but not limited to, the system memory 806 to the processor 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computing system 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies. The computing system 802 is generally is configured to implement all logic, systems, methods, apparatuses, and functionality described herein with reference to FIGS. 1-7B.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the system 100, e.g., the applet 103, private key 104, encrypted data 105, URLs 106, customer ID 107, operating system 112, account application 113, other applications 114, web browser 115, and/or the authentication application 123.

A user can enter commands and information into the computing system 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computing system 802. In addition to the monitor 844, a computer typically includes other peripheral output devices, such as speakers, printers, and so forth.

The computing system 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computing system 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 852 and the WAN 854.

When used in a LAN networking environment, the computing system 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computing system 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computing system 802, or portions thereof, can be stored in the remote memory/storage device 850. It will be appreciated that the network connections shown are exemplary and other means of establishing a communications link between the computers can be used.

The computing system 802 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method, comprising:
    receiving, by a server from a client device, a request comprising a uniform resource locator (URL), an entirety of the URL being a card identifier of a contactless card, wherein the URL is received by the client device from the contactless card, wherein the contactless card is associated with an account;
    comparing, by the server, the card identifier to an expected card identifier associated with the contactless card in a database;
    determining, by the server based on the comparison, that the card identifier matches the expected card identifier;
    authenticating the request by the server based on the card identifier matching the expected card identifier; and
    transmitting, by the server to the client device, an indication specifying that the request was authenticated.

2. The method of claim 1, wherein the expected card identifier is assigned to the contactless card in the database by the server.

3. The method of claim 2, wherein the contactless card is one of a plurality of contactless cards, wherein the server assigns a respective expected card identifier to each respective contactless card.

4. The method of claim 1, further comprising, prior to performing the comparison:
    determining, by the server, that the card identifier is encrypted; and
    decrypting, by the server, the card identifier using an encryption key.

5. The method of claim 1, further comprising:
    identifying, by the server, an indication of an operation in parameter of the URL; and
    transmitting, by the server to the client device based on the authentication of the request, account data associated with the account as a response to the operation associated with the request.

6. The method of claim 1, wherein the expected card identifier is one of a plurality of expected identifiers assigned to the contactless card in the database by the server.

7. The method of claim 6, further comprising, prior to performing the comparison:
    determining, by the server, an offset associated with the contactless card; and
    selecting, by the server based on the offset, one of the plurality of expected card identifiers as the expected card identifier.

8. A non-transitory computer-readable storage medium, the computer-readable storage medium including instructions that when executed by a processor, cause the processor to:
    receive, from a client device, a request comprising a uniform resource locator (URL), an entirety of the URL being a card identifier of a contactless card, wherein the URL is received by the client device from the contactless card, wherein the contactless card is associated with an account;
    compare the card identifier to an expected card identifier associated with the contactless card in a database;
    determine, based on the comparison, that the card identifier matches the expected card identifier;
    authenticate the request based on the card identifier matching the expected card identifier; and
    transmit, to the client device, an indication specifying that the request was authenticated.

9. The computer-readable storage medium of claim 8, wherein the expected card identifier is assigned to the contactless card in the database.

10. The computer-readable storage medium of claim 9, wherein the contactless card is one of a plurality of contactless cards, wherein a respective expected card identifier is assigned to each respective contactless card.

11. The computer-readable storage medium of claim 8, wherein the instructions further cause the processor to, prior to performing the comparison:
    determine that the card identifier is encrypted; and
    decrypt the card identifier using an encryption key.

12. The computer-readable storage medium of claim 8, wherein the instructions further cause the processor to:
    identify an indication of an operation in parameter of the URL; and
    transmit, to the client device based on the authentication of the request, account data associated with the account as a response to the operation associated with the request.

13. The computer-readable storage medium of claim 8, wherein the expected card identifier is one of a plurality of expected identifiers assigned to the contactless card in the database.

14. The computer-readable storage medium of claim 13, wherein the instructions further cause the processor to, prior to performing the comparison:
    determine an offset associated with the contactless card; and
    select, based on the offset, one of the plurality of expected card identifiers as the expected card identifier.

15. A computing apparatus comprising:
    a processor; and
    a memory storing instructions that, when executed by the processor, cause the processor to:
    receive, from a client device, a request comprising a uniform resource locator (URL), an entirety of the URL being a card identifier of a contactless card, wherein the URL is received by the client device from the contactless card, wherein the contactless card is associated with an account;
    compare the card identifier to an expected card identifier associated with the contactless card in a database;
    determine, based on the comparison, that the card identifier matches the expected card identifier;
    authenticate the request based on the card identifier matching the expected card identifier; and
    transmit, to the client device, an indication specifying that the request was authenticated.

16. The computing apparatus of claim 15, wherein the expected card identifier is assigned to the contactless card in the database.

17. The computing apparatus of claim 16, wherein the contactless card is one of a plurality of contactless cards, wherein a respective expected card identifier is assigned to each respective contactless card.

18. The computing apparatus of claim 15, wherein the instructions further cause the processor to, prior to performing the comparison:
   determine that the card identifier is encrypted; and
   decrypt the card identifier using an encryption key.

19. The computing apparatus of claim 15, wherein the instructions further cause the processor to:
   identify an indication of an operation in parameter of the URL; and
   transmit, to the client device based on the authentication of the request, account data associated with the account as a response to the operation associated with the request.

20. The computing apparatus of claim 15, wherein the expected card identifier is one of a plurality of expected identifiers assigned to the contactless card in the database, wherein the instructions further cause the processor to, prior to performing the comparison:
   determine an offset associated with the contactless card; and
   select, based on the offset, one of the plurality of expected card identifiers as the expected card identifier.

* * * * *